United States Patent
Khurana

(10) Patent No.: US 12,521,028 B2
(45) Date of Patent: Jan. 13, 2026

(54) SYSTEMS AND METHODS FOR ANALYSIS OF PULSE AND PHYSIOLOGICAL, PATHOLOGICAL, AND EMOTIONAL STATE AND APPLICATIONS THEREOF

(71) Applicant: Vikas Khurana, South Abington Township, PA (US)

(72) Inventor: Vikas Khurana, South Abington Township, PA (US)

( * ) Notice: Subject to any disclaimer, the term of this patent is extended or adjusted under 35 U.S.C. 154(b) by 100 days.

(21) Appl. No.: 18/036,882

(22) PCT Filed: Nov. 15, 2021

(86) PCT No.: PCT/US2021/059336
§ 371 (c)(1),
(2) Date: May 14, 2023

(87) PCT Pub. No.: WO2022/104184
PCT Pub. Date: May 19, 2022

(65) Prior Publication Data
US 2024/0016401 A1 Jan. 18, 2024

(51) Int. Cl.
*A61B 5/02* (2006.01)
*A61B 5/00* (2006.01)
*A61B 5/024* (2006.01)
*A61B 5/16* (2006.01)

(52) U.S. Cl.
CPC .......... *A61B 5/02416* (2013.01); *A61B 5/165* (2013.01); *A61B 5/7264* (2013.01)

(58) Field of Classification Search
CPC . A61B 5/015; A61B 5/02007; A61B 5/02055; A61B 5/02116; A61B 5/02405; A61B 5/02416; A61B 5/0261; A61B 5/0295; A61B 5/165; A61B 5/168; A61B 5/418; A61B 5/4824; A61B 5/7264; A61B 8/06; G16H 30/40; G16H 50/20; G16H 50/30; G16H 50/50
See application file for complete search history.

(56) References Cited

U.S. PATENT DOCUMENTS

| | | | |
|---|---|---|---|
| 2008/0214903 A1* | 9/2008 | Orbach | A61B 5/33 705/2 |
| 2009/0318908 A1* | 12/2009 | Van Pieterson | A61B 5/443 606/9 |
| 2010/0138379 A1* | 6/2010 | Mott | G16Z 99/00 706/52 |
| 2010/0317976 A1* | 12/2010 | Chelma | A61B 5/021 600/485 |
| 2017/0172520 A1* | 6/2017 | Kannan | A61B 5/7264 |
| 2017/0224990 A1* | 8/2017 | Goldwasser | A61N 1/0476 |
| 2019/0029589 A1* | 1/2019 | Gardner | A61K 9/107 |
| 2019/0282146 A1* | 9/2019 | Zand | A61B 5/0084 |
| 2019/0357855 A1* | 11/2019 | Sinha | G06N 20/00 |

* cited by examiner

*Primary Examiner* — Amanda K Hulbert
(74) *Attorney, Agent, or Firm* — Nitin Kaushik

(57) ABSTRACT

The present embodiment discloses an electronic method (100) for predicting physiological states of a subject. The embodiment involves predicting the physiological states instantly based on each peak of the pulses during heart beating. The physiological states may be clinical such as heart related, stress related problems, drowsiness, and so on. In some instances, the physiological states may be non-clinical such as behavioral-anger, anxiety, and so on.

11 Claims, 23 Drawing Sheets

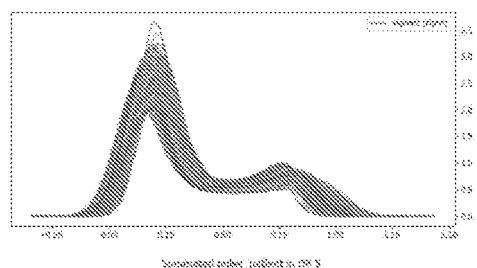
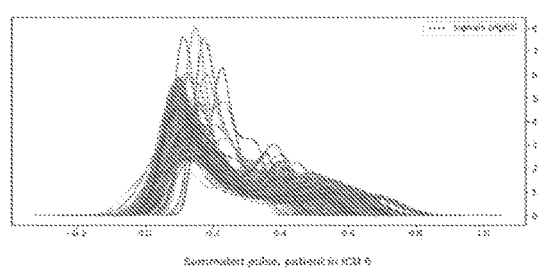
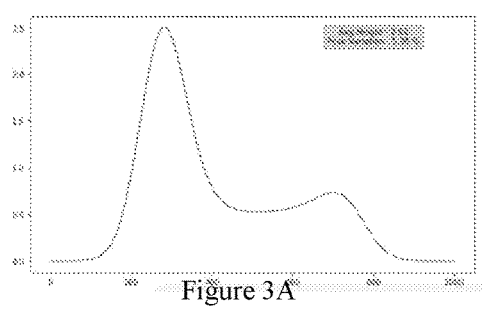
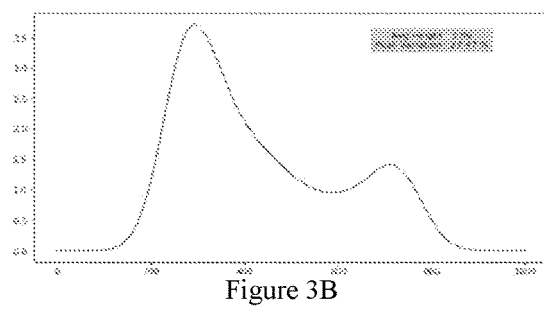
Figure 3A
Figure 3B
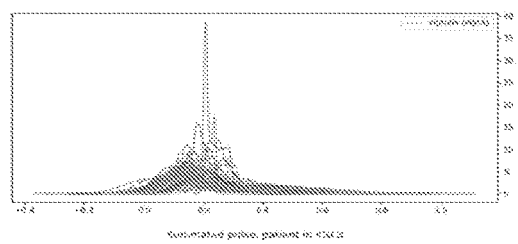
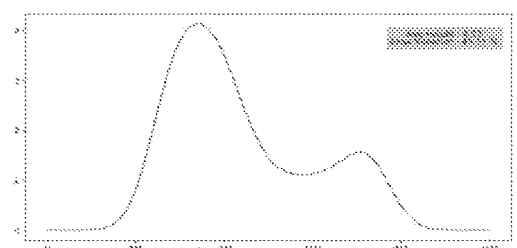
Figure 3C

SYSTEMS AND METHODS FOR ANALYSIS OF PULSE AND PHYSIOLOGICAL, PATHOLOGICAL, AND EMOTIONAL STATE AND APPLICATIONS THEREOF

TECHNICAL FIELD

The present disclosure generally relates to an electronic method for predicting the clinical or non-clinical outcome of a subject. More particularly, the present disclosure relates to the methods for predicting the clinical or the non-clinical outcome based on real time pulse parameters and/or imaging (or infrared imaging and/or Visible light imaging) and systems and devices related to thereof.

BACKGROUND

As per recent WHO reports, an estimated 17.9 million people died from cardiovascular diseases (CVDs) in 2019, representing 32% of all global deaths. Of these deaths, 85% were due to heart attack and stroke. No disease develops in one day, symptoms thereof gradually increase over time. It hence becomes pertinent to monitor or predict such symptoms, if possible, before the actual event to decrease mortality. Therefore, it becomes important to track pulse rate, monitor thereof, and predict clinical or non-clinical outcomes of a subject in order to reduce the casualties.

The number of heartbeats in one minute defines the pulse rate. Heart Rate Variability (HRV) is the study of the variation in heartbeats in an individual. HRV is the spontaneous fluctuations in the interval between two successive heartbeats. Heart Rate variability is also shown to reflect the regulation of the autonomic nervous system, oscillating between an increasing and decreasing parasympathetic effect. Greater Heart Rate Variability (a higher HRV score) at rest is generally indicative of better health, a younger biological age, and better aerobic fitness. However, Heart Rate Variability is affected by everything from your emotional state to air quality, to age, stress and exercise patterns.

There are conventional methods and devices that monitor the HRV score. For example, a chest-strap heart monitor, and a smart device like a wristwatch. Such devices consider the recording of the pattern of heartbeats for at least 10 minutes. However, even smaller segments of pulse and every individual pulse can be reflective of physiological and pathological states of a subject. Even a continuous stable running of the pulses for 1 minute can provide insights into the physiological state of the person. Long term cyclical patterns of pulse are being used to predict blood pressure, respiratory rate and other parameters of health and disease. Hence, it is important to track continuous patterns of the human state by using the pulse rates to provide real-time data and HRV. Machine learning models have been developed but are unable to penetrate clinical use. Recording for longer time intervals of pulse rates may provide inaccurate and superficial results. The present technology being used to track the pulse is through wearable body sensors. To keep the power consumption low the sampling rate has been decreased, the margin of error for predicting the instant time of pulse peak has increased due to decreased sampling rate, consequently the HRV calculation error has increased significantly. The trend towards decreasing power consumption has persuaded the users away from the benefits of higher sampling rates.

The conventional methods hitherto make use of either Electrocardiogram (ECG) or pulse plethysmography (PPG) or a combination of PPG with ECG to determine several physiological states of a subject. However, the current methods employ data of one PPG pulse peak with another and are restricted to only a few select parameters. However, none of the existing technologies tracking heart rate variability takes into consideration the pulse morphology. The ECG requires electrical sensors and wire connections and is not preferred sometimes given the inconvenience of electrical wires, and safety issues. This leads to PPG becoming the preferential method of determining heart rate and computing HRV. Given the high-power consumption by the PPG sensors in wearable devices, the trend is to decrease the sampling size in an effort to decrease the power consumption. This leads to a longer-lasting battery. However, it compromises the accuracy of HRV significantly.

Furthermore, remote photoplethysmography (rPPG) is increasingly being applied in various applications. The standard frame rate at which an rPPG is captured is of 30 FPS, which is the most commonly used methodology. Capturing an additional video at a higher frame rate requires a significantly increased computing power and energy consumption. The trend is to decrease the sampling rate while recording the rPPG. The trend towards decreasing power consumption and decreasing the required computing power has persuaded users away from the benefits of obtaining high frame rate video images for rPPG. This has limited the applications of rPPG in detecting the heart rate and minor variations of pulse rate and the potential hidden information it can provide us regarding the human physiology. Advanced morphology studies of rPPG are generally abandoned at this stage.

Further, seizures can be extremely discomforting and fatal for people suffering from epilepsy and otherwise. Seizure detection and classification is an uphill task requiring manual annotations and inputs from highly skilled physicians. There have been many studies and systems designed for seizure detection which apply deep learning techniques, to Electroencephalogram (EEG) brain signals for predicting the onset of seizures. But such algorithms have not been effective enough to be clinically deployed, owing to the low sensitivity of the seizure event detection. Contemporary attempts at seizure detection using only scalp recordings have had high false alarm rates. This stems from the basis of various noise signals and artefacts that are invariably produced because of eye movements, background or equipment generated noise, patient behavior etc. A few studies have obtained high accuracies in eliminating the noise from EEG signals. While most studies have focused on processing, visualizing and running neural nets on EEG signals, very few have focused on heart rate variability as a biomarker for seizure detection and prediction.

SUMMARY OF THE INVENTION

As mentioned in the foregoing, the embodiment herein provides an electronic method for predicting the physiological, pathological, and emotional states of a subject. The embodiment involves predicting the physiological states instantly based on each peak of the pulses during heart beats. Some physiological states may be clinically relevant such as stress, fight Vs. flight reactions, anger or anxiety, attention or drowsiness or heart related diseases.

In view of the foregoing, an electronic method (100) for predicting physiological states of a subject is provided.

In an aspect, the method (100) for predicting physiological states of a subject involves acquiring (102) an input of a photoplethysmography (PPG) sample in the form of peak(s) representing a pulse(s) on an X-axis and a Y-axis from a video or an image, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of summed points from all kernels obtained from the KDE, continuing (120) step (118) for each of the individual pulses, obtaining (122) mean KDE for all the individual pulses, and receiving (124) a summated pulse.

In yet another aspect of the invention, the method (100) further comprises computing (126) average height and variation of peak of each individual pulse. In yet another aspect of the invention, the method (100) further comprises rejecting the particular segment of the pulses if the mean of the individual pulses is out of the limit of the sample median with or without the standard deviation.

In yet another aspect of the invention, the method (100) further comprises of obtaining the video or the image by endoscopy.

In another aspect of the invention, an electronic method (200) for predicting clinical and non-clinical outcomes of a subject is provided.

The method (200) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of summed points from all kernels obtained from the KDE, continuing (120) step (118) for each of the individual pulses, obtaining (122) mean KDE for all the individual pulses, receiving (124) the summated pulse, acquiring (202) a image of the body of the subject by, recording (204) video of skin for at least 5 seconds, selecting (206) the best one second data, capturing (208) a plurality of images of the skin of the subject, converting (210) thereof into pixel level data, the pixel level data being three dimensional, superimposing (212) the images one above another to acquire a single image of two dimensions reflecting blood flow into the skin tissue, computing (214) pulse variability and mean, replacing (216) temperature with the standard deviation, converting (218) the analysis into color coded heat map, tracking (220) the fluctuating heat of depth of the surface of the skin, computing (222) width of the envelope of each pulse variation, capturing (224) a plurality of images of a target area using an infrared camera at a plurality of different time intervals, adding (226) visible light to the images for differentiating the type of tissue, adding (228) ultraviolet light to the images for determining infection of a tissue of the subject, and integrating (230) analysis of the pulse reading with analysis of the imaging for detecting divergence between the predicted and actual data. In another aspect of the method (200), wherein the image can be selected from a group of a light/visible image, thermal image, or an ultrasound image.

In another aspect of the invention, an electronic method (300) for predicting clinical and non-clinical outcomes of a subject is provided. The method (300) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step (118) for each of the individual pulses, obtaining (122) mean KDE for all the individual pulses, receiving (124) a summated pulse, acquiring (202) a image of the body of the subject by, recording (204) video of skin for at least 5 seconds, selecting (206) the best one second data, capturing (208) a plurality of images of the skin of the subject, converting (210) thereof into pixel level data, the pixel level data being three dimensional, superimposing (212) the images one above another to acquire a single image of two dimensions reflecting blood flow into the skin tissue, computing (214) pulse variability and mean, replacing (216) temperature by the standard deviation, converting (218) the analysis into color coded heat map, tracking (220) the fluctuating heat of depth of the surface of the skin, computing (222) width of the envelope of each pulse variation, capturing (224) a plurality of images of a target area using an infrared camera at a plurality of different time intervals, adding (226) visible light to the images for differentiating the type of tissue, adding (228) ultraviolet light to the images for determining infection of a tissue of the subject, capturing (302) facial patterns of the subject by detecting, tracking, and recognizing thereof, and merging (304) the pulse reading analysis with the imaging analysis and facial pattern analysis for detecting precise divergence between the predicted and actual data for predicting the clinical and non-clinical outcomes of the subject.

In another aspect of the invention, an electronic method (400) for determining drowsiness or alertness level or fatigue of a subject is provided.

The method (400) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step 118 for each of the individual pulses, obtaining (122) mean KDE for all the individual pulses, receiving (124) a summated pulse, and alerting (402) the subject responsive to divergence between actual and predicted dataset of the variations of individual pulses.

In yet another aspect of the invention, the method (400) further comprises acquiring a video pulse of the subject. In yet another aspect of the invention, the method (400) further comprises acquiring images of the subject. In yet another aspect of the invention, the method (400), further comprises detecting and tracking facial patterns of the subject.

In another aspect of the invention, a system (500) for predicting clinical and non-clinical outcomes of a subject is provided.

The system (500) includes a pulse reading module (502) capable of determining the heart rate, a imaging module (504) capable of capturing a plurality of images of a target area, a quantification module (506) communicates with the pulse reading module (502) and the imaging module (504), wherein the quantification module is capable of processing the heart rate and the images for determining the core body temperature, and an output module (508) communicates with the quantification module (506), wherein the output module is capable of displaying divergence between actual and predicted dataset of the variations of individual pulses.

In another aspect of the invention, an electronic method (600) for determining pathophysiological state of a subject is provided.

The method (600) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step (118) for each of the individual pulses, obtaining (122) mean KDE for all the individual pulses, receiving (124) a summated pulse and predicting (602) the pathophysiological state of the subject responsive to divergence between actual and predicted dataset of the variations of individual pulses.

In yet another aspect of the invention, the method (600) further comprises acquiring a video pulse of the subject. In yet another aspect of the invention, the method (600) further comprises acquiring images of the subject. In yet another aspect of the invention, the method (600) further comprises detecting and tracking facial patterns of the subject.

In yet another aspect of the invention, method (700) for deciphering cognitive state of a subject is provided.

The method (700) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step (118) for each of the individual pulses, obtaining (122) mean KDE for all the individual pulses, receiving (124) a summated pulse, and predicting (702) the cognitive states of the subject responsive to divergence between actual and predicted dataset of the variations of individual pulses.

In another aspect of the invention, an electronic method (800) for detecting lies is provided.

The method (800) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step 118 for each of the individual pulses, obtaining (122) mean KDE for all the individual pulses, receiving (124) the summated pulse, and detecting (802) if a subject is lying responsive to divergence between actual and predicted dataset of the variations of individual pulses.

In another aspect of the invention, an electronic method (900) for tracking confidence of a subject is provided.

The method (900) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step 118 for each of the individual pulses, obtaining (122) mean KDE for all the individual pulses, receiving (124) the summated pulse, determining (902) confidence of the subject responsive to divergence between actual and predicted dataset of the variations of individual pulses.

In another aspect of the invention, an electronic method (1000) for tracking episodes of depression of a subject is provided.

The method (1000) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step 118 for each of the individual pulses, obtaining (122) mean KDE for all the individual pulses, receiving (124) the summated pulse, and tracking (1002) episodes of depression of the subject responsive to divergence between actual and predicted dataset of the variations of individual pulses.

In another aspect of the invention, an electronic method (1100) for tracking and analyzing episodes of psychological crisis and its response to therapy is provided.

The method (1100) involves measuring (201) the pulse reading of the heartbeat of the subject by, acquiring (102) an input of a photoplethysmography (PPG) sample in the form of peak(s) representing pulse(s) on X-axis and Y-axis, normalizing (104) the Y axis, computing (106) median and standard deviation of height of all comparable points of the pulse, identifying (108) start and end points of an individual pulse cycle, breaking (110) the input sample into individual pulses, computing (112) mean height of all points in each of the individual pulses, validating (114) if mean of the individual pulses is out of the limit of the sample median with or without the standard deviation, applying (116) kernel density estimates (KDE) on each of the individual pulse, procuring (118) a plurality of the summed points from all kernels obtained from the KDE, continuing (120) step 118 for each of the individual pulses, obtaining (122) mean KDE for all the individual pulses, receiving (124) a summated pulse, and tracking (1102) and analyzing responsiveness to the therapies used in the treatment of psychological crisis by analyzing the divergence between actual and predicted dataset of the variations of individual pulses.

In another aspect of the invention, an electronic method (1200) for predicting physiological states of a subject is provided. The method (1200) involves acquiring (1202) an input of a photoplethysmography (PPG) sample in the form of peak(s) representing pulse(s) on X-axis and Y-axis, applying (1204) single pulse envelope wave (SPEV), applying (1206) pulse tracing envelope wave (PTEV), computing (1208) median and standard deviation of height of all comparable points of the pulse, computing (1210) median and standard deviation of height of all comparable points of the various envelope waves, identifying (1212) start and end points of an individual pulse cycle, breaking (1214) the input sample into individual pulses, computing (1216) mean height of all points in each of the individual pulses, procuring (1218) a plurality of the summed points from all envelope waves obtained and continuing thereof for each of the individual pulses, and receiving (1220) summated statistics that predicts physiological state of the subject by detecting divergence between predicted and actual statistics.

In another aspect of the invention, an electronic method (1400) for predicting endoscopic blood flow pattern in real time is provided. The method (1400) involves capturing (1402) a video of a target area, acquiring (1403) an PPG pulse from the video, analyzing and selecting (1404) an optimum frame from the video, extracting (1406) a plurality of images from the frame of the video, arranging (1408) the plurality of images with respect to time, mapping (1410) the plurality of images by selecting a plurality of comparative points therein, superimposing (1412) a mapped plurality of images obtained at (1410), converting (1414) a superimposed image obtained at (1412) into pixel level data, computing (1416) the time change per pixel in an RGB pattern, analyzing (1418) a principal pattern of RGB to predict blood flow, clustering (1420) the principal pattern into an RGB pixel array, computing (1422) standard deviation of the pixels in the RGB pixel array, scaling (1424) the standard deviation obtained at (1422) between 1-7 values, assigning (1426) each value a color, and generating (1428) a heat map according to the color assigned to the clusters.

In yet another aspect of the invention, the method (1400), wherein the target area comprises a part of the body of a subject, or a tissue, or an organ, or a combination of thereof. The method (1400), wherein the video is captured in slow-motion at a frame rate above 30 fps. The method (1400), wherein factors influencing RGB pattern are night vision capability, skin pigmentation, temperature, light condition, type of the camera used. The method (1400), wherein the colors include violet, indigo, blue, green, yellow, red or a combination thereof. The method (1400), wherein change in the red and blue color in the heat map over time predicts oxygen concentration in the area.

In another aspect of the invention, an electronic method (1500) for predicting a chance of death in a subject is provided. The method (1500) involves acquiring (1502) an input of a photoplethysmography (PPG) sample in the form of peak(s) representing pulse(s) on X-axis and Y-axis, applying (1504) single pulse envelope wave (SPEV), applying (1506) pulse tracing envelope wave (PTEV), computing (1508) a median wave morphology, assigning (1510) the median wave morphology to time on X-axis, computing (1512) the percentage of each of the 10 clusters, evaluating (1514) the change in the percentage of the 10 clusters over time, and predicting (1516) the chance of death.

In yet another aspect of the invention, another method (1700) for predicting physiological states of a subject is provided. the method (1700) comprising capturing (1702) a video of the target area, acquiring (1704) an input remote photoplethysmography (rPPG) sample in the form of a peak(s) representing a pulse(s) on an X-axis and a Y-axis from the captured video, normalizing (1706) the Y-axis, computing (1708) median and standard deviation of normalized peaks height of all comparable points of the pulse, identifying (1710) start and end points of an individual pulse from the recorded pulse sample, breaking (1712) the input sample into individual pulses, computing (1714) mean height of all points in each of the individual pulses, validating (1716) if mean of the individual pulses is out of the limit of the sample median with or without the standard deviation, applying (1718) kernel density estimates (KDE) on each of the individual pulse, procuring (1720) a plurality of summed points from all kernels obtained from the KDE, continuing (1722) step (1720) for each of the individual pulses, obtaining (1724) mean KDE for all the individual pulses, and receiving (1726) a summated pulse that predict physiological state of the subject by detecting divergence between predicted and actual pulse.

In yet another aspect of the invention, another method (1800) for computing physiological states of a subject is provided. The method (1800) comprising capturing (1802) a video of the target area, acquiring (1804) an input photoplethysmography (PPG) sample in the form of a peak(s) representing a pulse(s) on an X-axis and a Y-axis from the captured video, breaking (1806) the input PPG sample into individual pulses, breaking (1808) the individual pulses into arterial blood inflow phase and venous blood outflow phase, subtracting (1810) the venous pulse from the arterial pulse to obtain lymphatic pulse, selecting (1812) either arterial blood inflow phase or venous blood outflow phase or the lymphatic flow outflow phase, normalizing (1814) the Y-axis for each phase, computing (1816) median and standard deviation of normalized peak heights of all comparable points of the pulse for each phase, identifying (1818) start and end points of an individual pulse from the recorded pulse for each phase, computing (1820) mean height of all points in each of the individual pulses, validating (1822) if mean of the individual pulses is out of the limit of the sample median with or without the standard deviation, applying (1824) kernel density estimates (KDE) on each of the individual pulse, procuring (1826) a plurality of summed points from all kernels obtained from the KDE, continuing (1828) step (1826) for each of the individual pulses, obtaining (1830) mean KDE for all the individual pulses, and receiving (1832) a summated pulse that predict physiological state of the subject by detecting divergence between predicted and actual pulse for each phase.

The preceding is a simplified summary to provide an understanding of some aspects of embodiments of the present invention. This summary is neither an extensive nor exhaustive overview of the present invention and its various embodiments. The embodiment described and summarized herein may be applied to vertebrates and invertebrates with flowing bodily fluids. The physiological, pathological, and emotional states of a subject are used interchangeably. Imaging could be or light imaging images (or infrared imaging and/or Visible light imaging). Within the meaning of this specification, the or Infrared imaging is used interchangeably. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein:

FIGS. 3A-3C depict peak curve variations of the individual pulses as measured while reading and analyzing pulses of the subject, according to another embodiment herein;

To facilitate understanding, like reference numerals have been used, where possible, to designate like elements common to the figures.

DETAILED DESCRIPTION OF THE PREFERRED EMBODIMENTS

Figure 1:
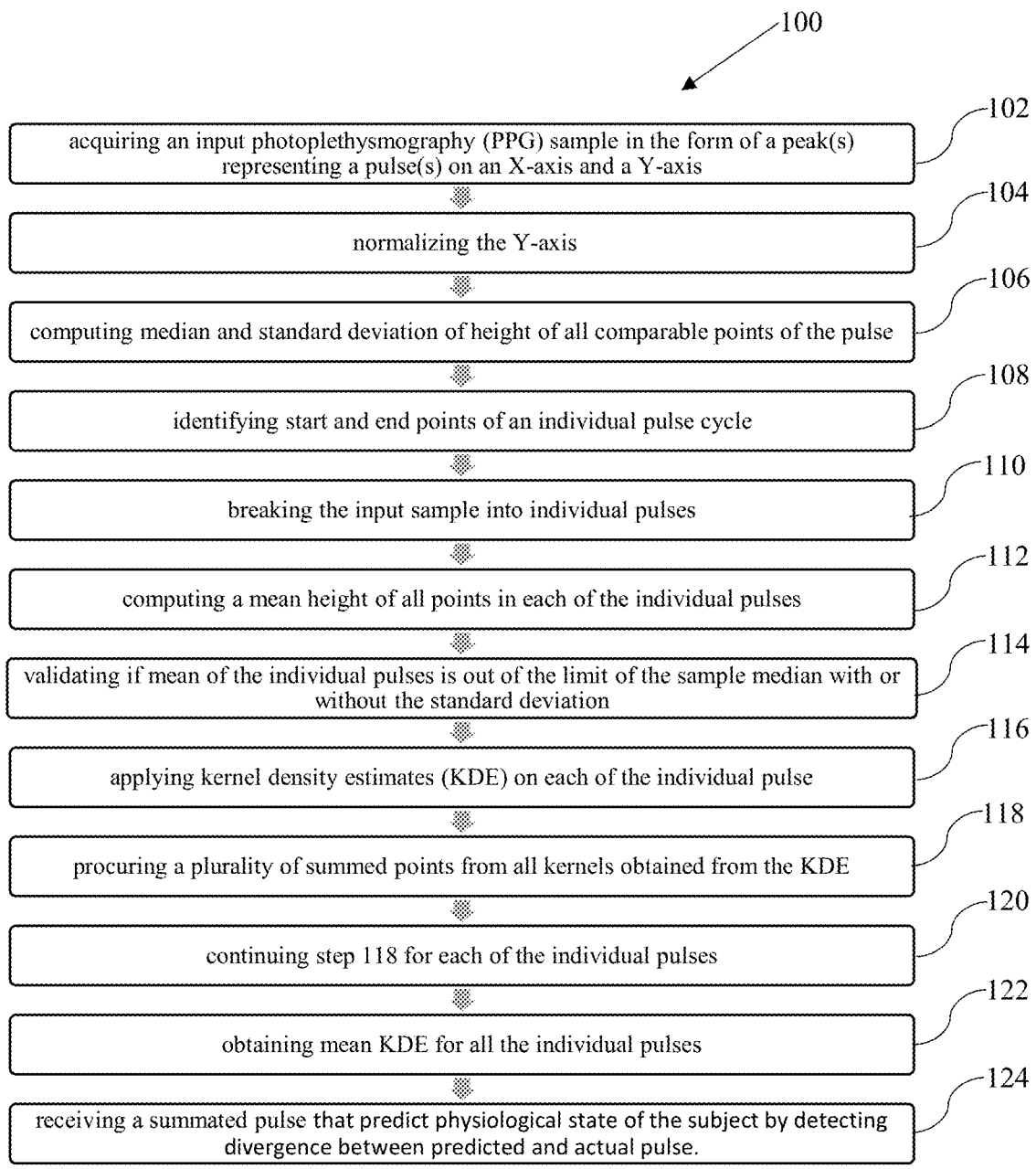
FIG. 1 illustrates a flowchart depicting an electronic method (100) determining the pathophysiological state of a subject is provided, according to an embodiment herein.

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "subject" refers to a subject, or an organ or a tissue or an area that is targeted or the whole body.

The term "pulse" and "signal pulse" have been used interchangeably.

Since the PPG signal varied in origin and amplitude, a Min-Max Scaler on the data to rescale the PPG signal to put emphasis on amplitude variation instead of absolute values was used. Normalizing the amplitude was an important step as we observed that the starting point of the PPG signal varied across patients and without normalizing there would be an issue in our analyses as there would be no standard base point in the data.

The term "endoscopic blood flow pattern" means the blood flow pattern in the tissue being studied/analyzed through an endoscope.

If mean of the individual pulses is out of the limit of the sample median with or without the standard deviation that segment of a pulse is considered 'highly noisy'.

Thus, there exists a need for developing methods and systems for accurately predicting real-time clinical and non-clinical outcomes more accurately, hence predicting high mortality and potentially saving the lives of many subjects.

As mentioned above, that the present disclosure overcomes the problem associate with the methods of the prior art that either employ EEG, ECG, or PPG or PPG together with ECG or in any other combination to determine physiological state of a subject with far less accuracy and that too between at least two pulses of a subject. The present embodiment herein provides an electronic method of analyzing multiple parameters of a subject within a single PPG pulse and uses the variations of those parameters to determine multiple physiological and pathological states of a subject with a greater accuracy. The data within a single PPG pulse can be compared to baseline characteristics of the person's pulse and make use of the parameter namely peaks and width of wave obtained within defined segments of a single PPG pulse/wave, which are different for different individuals under different physiological and pathological states. This peak data may be used to further compute or predict heart rate variability, peak arrival time, blood pressure, arterial blood inflow (ABF), venous blood outflow (VBF), lymphatic blood flow (LBF), and several heart dynamics. The pulse data not only incorporates the heart function data, it also shows the effect of various external factors (like room temperature, gravitational forces in space flight etc.), internal factors (like pain, fever, sepsis etc.) and emotional state of the person (like anger, stress, happiness etc.) on the local tissue level pulse. For example, the blood supply of the ear is influenced by the emotional state of a vertebrate animal.

In another embodiment, an electronic method and a system for pulse reading is provided that involves processing each of the individual peaks of the pulses of a sample data of PPG, computing HRV, further using the morphology of the individual pulses, applying single pulse envelope wave (SPEV), Pulse tracing envelope wave (PTEV), applying kernel density estimates (KDE) on each of the individual pulses, and analyzing thereof for predicting the physiological state instantly. As such the method according to the embodiment herein includes either one or all or combination of following methods of processing the sample PPG data by:

Computing HRV from PPG pulse by measuring parameters of pulse such as width or distance between two subsequent peaks where the pulse is sampled at high frequency of at least 1000 Hz with error rate 2 ms thus providing a more continuous, real time and near-real data of pulse.

Figure 4A:
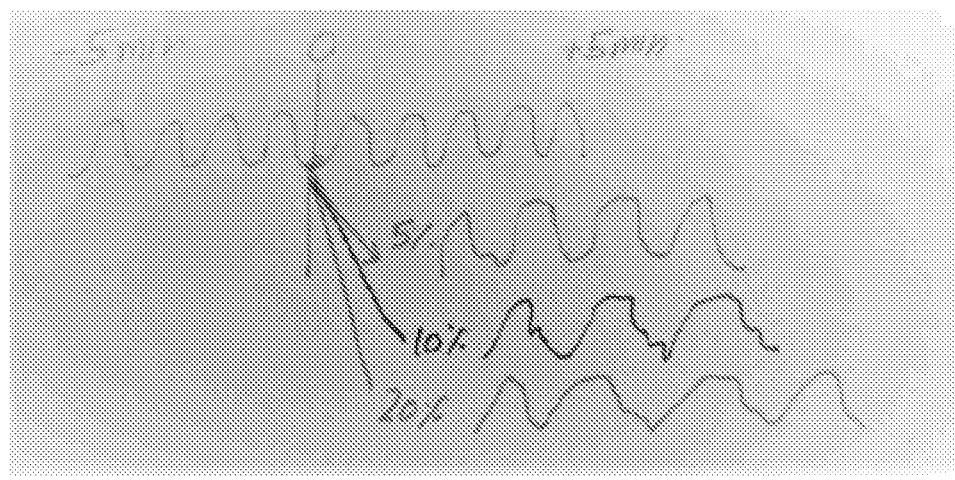
FIG. 4A-4D illustrates morphology of two PPG waves, and FIG. 4B, 4C (actual) illustrates traces of a PPG wave from hypothetical subject (4A), according to another embodiment herein.
Figure 4B:
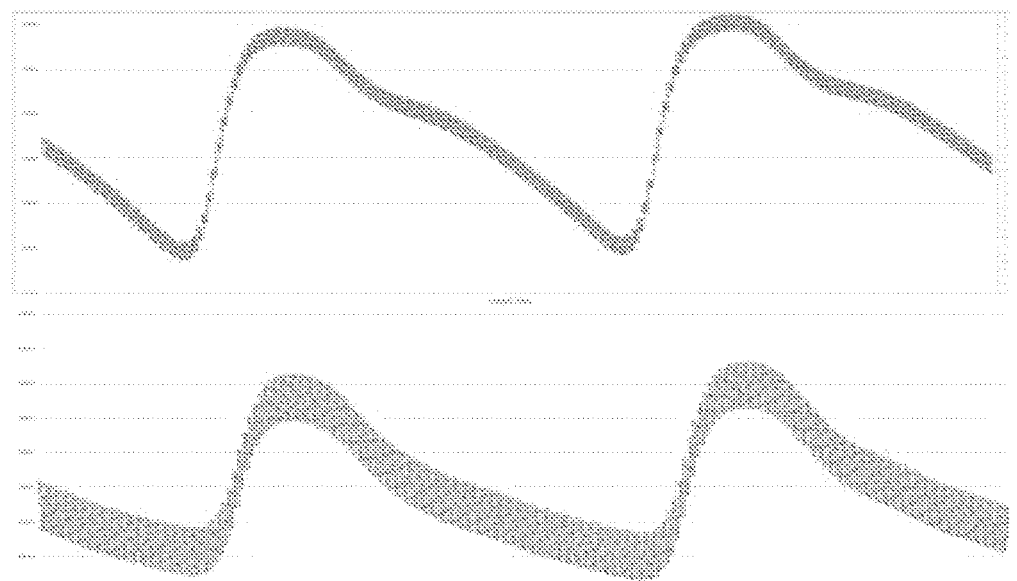
Figure 4C:
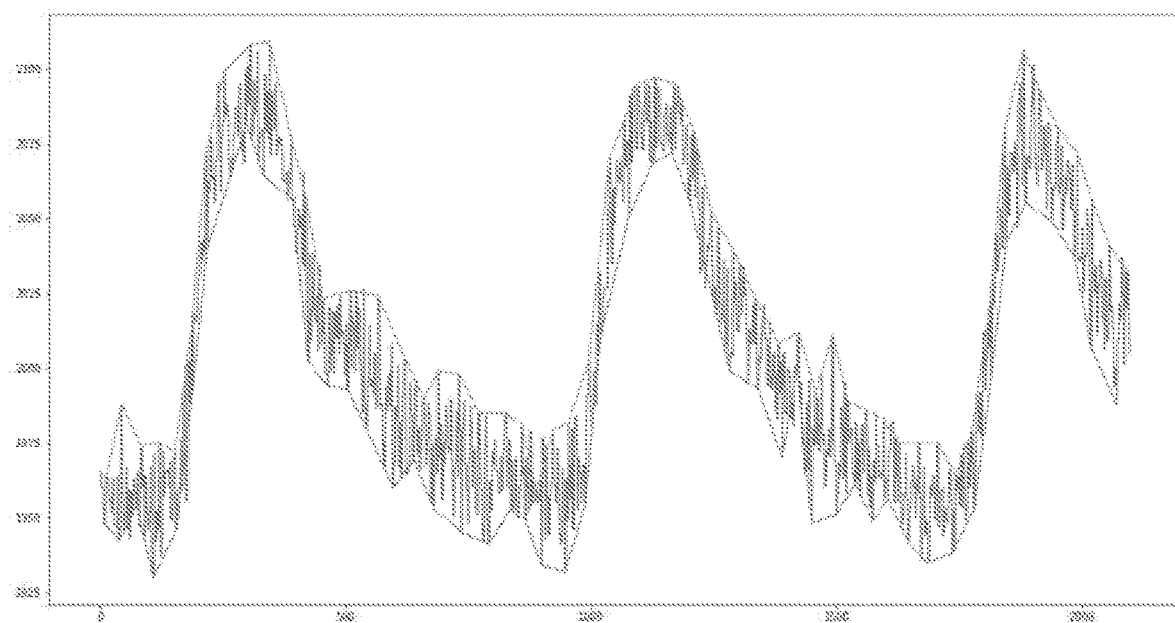
Figure 4D:
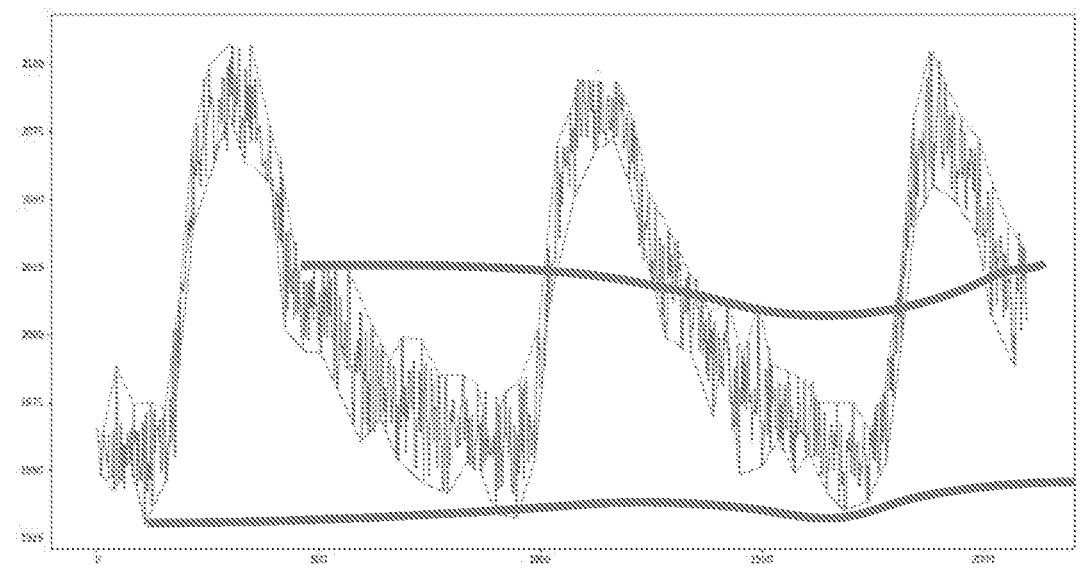

The next step of processing may include studying/determining/analyzing envelope of macro pulse as the macro changes provide additional information that is predictive of cardiovascular health together with other health and wellness parameters. In another embodiment, a wave may be added to a dicrotic notch, and performs for top of dicrotic wave, and bottom of dicrotic wave that includes determining parameters related to pulse between different envelopes. FIG. 4C depicts a blue thin serrated line for pulse tracing, Yellow thick line, and red thick line for/depicting Pulse tracing envelope wave (PTEV). The thick blue line is Notch tracing line, while Orange thin line and Green thin line encompass single pulse envelope wave (SPEV).

A further step of reading of a PPG pulse may include reading/analyzing the envelope (FIG. 4C) of an individual pulse using rPPG that provides blood pressure estimate thus allowing contactless blood pressure monitoring and measuring. The fluctuations in the pressure are proportional to the various components of the PPG envelope wave and such fluctuations may be modelled and trained for a detailed model. The envelope wave thickness allows predicting the local microvascular health e.g., of cold hand experiment in which the lower curve is from the hand dipped in cold water (FIG. 4B). Similar predictions may be made for microvascular diseases in diabetes for individual tissues like feet.

Figure 5:
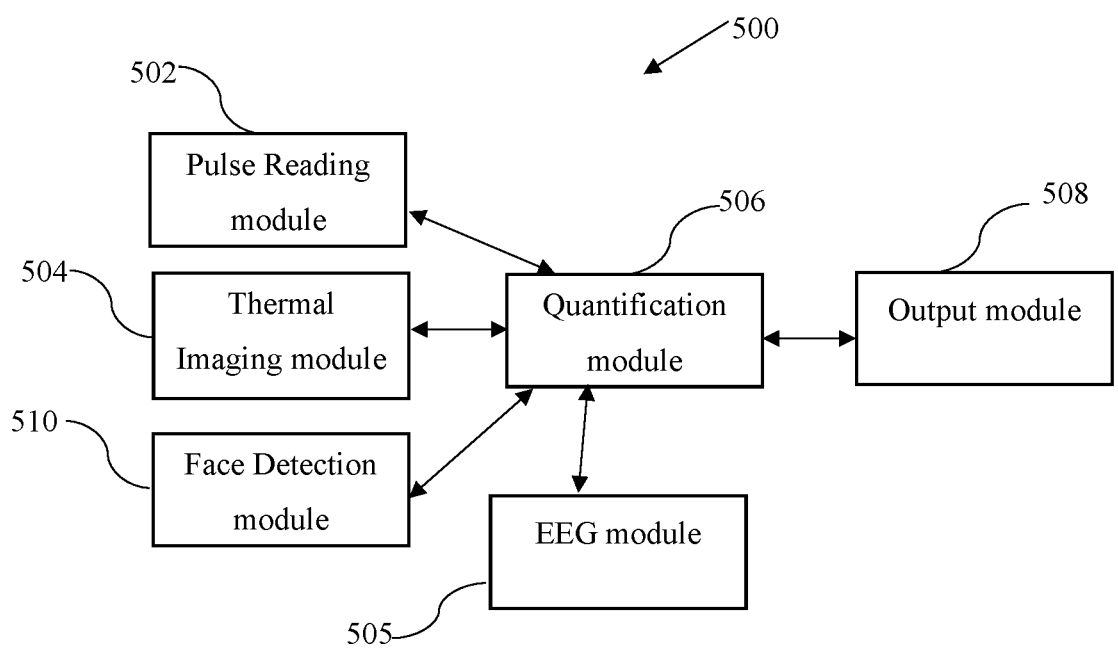
FIG. 5 illustrates a system (500) for determining the pathophysiological state of an individual is provided, according to another embodiment herein.

The further processing includes applying a KDE processing step for stability and is performed on multiple individual waves (refer to FIG. 5). The KDE processing includes cutting individual waves as per defined criteria, overlaid on each other and variation parameters are studied for individual peaks (mean, SD, median and other statistical values.)

In another embodiment, HRV analysis captures beat to beat variability over time. Envelope wave captures the blood pressure changes during an individual pulse and adding a bigger envelope around the pulse recording segment will capture additional parameters other than HRV alone for long cyclical patterns. KDE processing is for beat to beat stability and provides a comparative method over a longer period such as for use cases in determining whether a subject is clinically stable, lying or is nervous.

FIG. 1 illustrates an electronic method (100) for predicting physiological states of a subject by measuring, determining, detecting and analyzing intra-pulse data i.e., measuring variations within a pulse as function of time or individual and/or as function of physiological/pathological state of a subject, according to an embodiment herein. The method (100) comprises of acquiring (102) an input of a photoplethysmography (PPG) sample in the form of peak(s) representing a pulse(s) on an X-axis and a Y-axis from a video or an image. The method (100) further comprises normalizing (104) the Y-axis. The method (100) further comprises computing (106) median and standard deviation of normalized peak heights of all comparable points of the pulse. The method (100) further comprises identifying (108) start and end points of an individual pulse from the recorded pulse sample. The method (100) further comprises breaking (110) the input sample into individual pulses. The method (100) further comprises computing (112) mean height of all points in each of the individual pulses. The method (100) further comprises validating (114) if mean of the individual pulses is out of the limit of the sample median with or without the standard deviation. The method (100) further comprises applying (116) kernel density estimates (KDE) on each of the individual pulse. The method (100) further comprises procuring (118) a plurality of summed points from all kernels obtained from the KDE. The method (100) further comprises continuing (120) step (118) for each of the individual pulses. The method (100) further comprises obtaining (122) mean KDE for all the individual pulses and receiving (124) a summated pulse that predicts physiological state of the subject by detecting divergence between predicted and actual pulse.

The method (100) further comprises rejecting a particular segment of the pulses if highly noisy or mean of the individual pulses is out of the limit of the sample median with or without the standard deviation.

The method (100) further comprises, obtaining the video or the image by endoscopy. In an embodiment, endoscopy is defined as a procedure where organs inside a body are looked at using an instrument called an endoscope. An endoscope is a long, thin, flexible tube that has a light and camera at one end.

As shown in FIGS. 3A, 3B, and 3C the pulse summation using the KDE model has several advantages over the presently available methods. FIG. 3A shows a stable patient, pulse morphology is similar and predictable for most of the pulses, as can be seen in the curve and in the statistical values. The summary graph as seen in the lower part of FIG. 3A shows a summated line curve. FIG. 3B shows an unstable patient and FIG. 3C shows the pattern of a critical patient. The summated pulse line in the lower half of the FIGS. 3A, 3B, and 3C are normalized and hence standardized for various patient and technical factors. This makes KDE based summary of fixed time frame of pulse comparable across an individual patient and across different patients. The standardized method of displaying the information has the potential of using the pulse as the new test like ECG (tests electric current of heart) for cardiovascular diseases. In another embodiment, the KDE based pulse morphology analysis can test not only for heart function (like ECG) but can also provide additional functional information about the blood vessels and microvascular components of the cardiovascular system, thus can be used as a functional and predictive test for various components of the cardiovascular system such as arterial blood inflow, venous blood outflow, lymphatic blood flow. The comparative pulse morphology analysis based on the described method (100) can be obtained from different parts of the body to provide health of an individual organ (like eyes) or structure (e.g., feet compared to hands) and an overall health of the cardiovascular system of the patient.

FIG. 4B shows two pulse sampling done at 1 kHz frequency. The mentioned figure shows time synchronous tracing from the same subject, with one hand at room temperature (top tracing) and the other dipped in cold water and dried (bottom tracing). The heartrate variability and other parameters from these tracing report the same values (not shown), however based on the envelope waves the patterns are different in terms of thickness and subtle pulse morphology. These significant differences are indicating microvascular changes in the skin due to cold exposure.

Furthermore, historical data of pulse is analyzed using mathematical model and employing an artificial intelligence framework to predict future pulse data, which in turn, are used for what is termed as tracing. The mathematical model is validated by measuring actual subject data following the historical period of time with the predicted data. If there is no change in pathophysiological state of the subject, the difference between the predicted and actual data is minimal. In case there is a significant change in the pathophysiological state of the subject, a divergence in the predicted and actual data is observed. Such a system when employed real time and displays such patterns is indicative of clinical progress or deterioration (i.e., changes in pathophysiological state of the subject). In another embodiment, such a study or analysis may be carried out for a number of intervals with an alarm or alert going off (or displayed on a display module) as and when a divergence between predicted and actual data, more than a predetermined threshold, is observed.

In another embodiment, the differences may also be color-coded for attention. For example, a display of red, yellow, and green (as shown in FIG. 4A) may respectively be used for danger, need to pay attention, and be stable, respectively. Other visual and audible means may also be employed to alert a caregiver of the pathophysiological state of the subject.

In another embodiment, the heart rate is measured by placing a finger on the camera of the device. In another embodiment, the flashlight of the devices serves as the light source in the visible range for reflection by the blood cells of the individual. In an embodiment, the light reflected is different in systole and diastole. In an embodiment the light source can emit infrared light.

Figure 2:
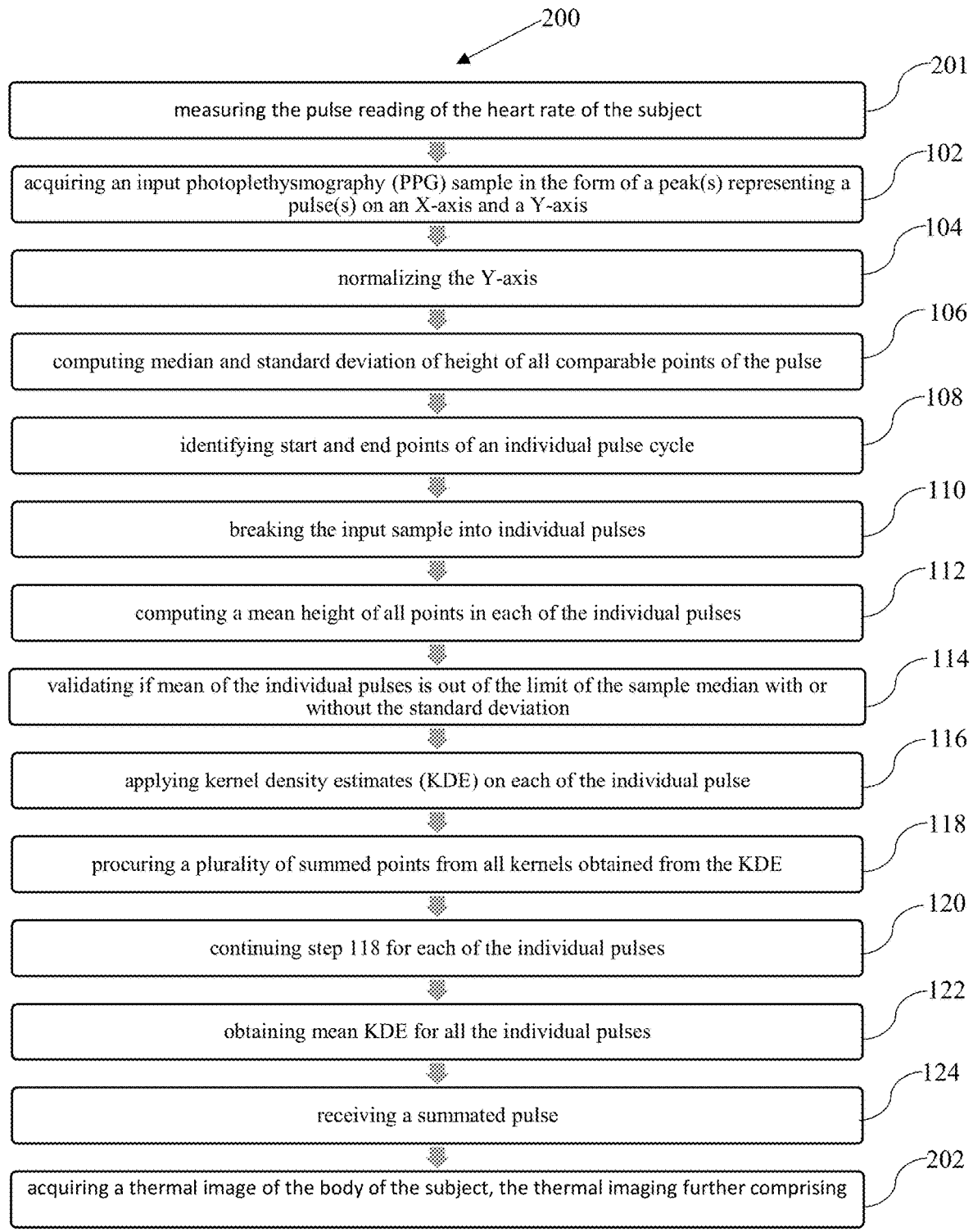
FIG. 2 illustrates a flowchart depicting an electronic method (200) for predicting clinical and non-clinical outcomes of a subject is provided, according to another embodiment herein.
Figure 2:
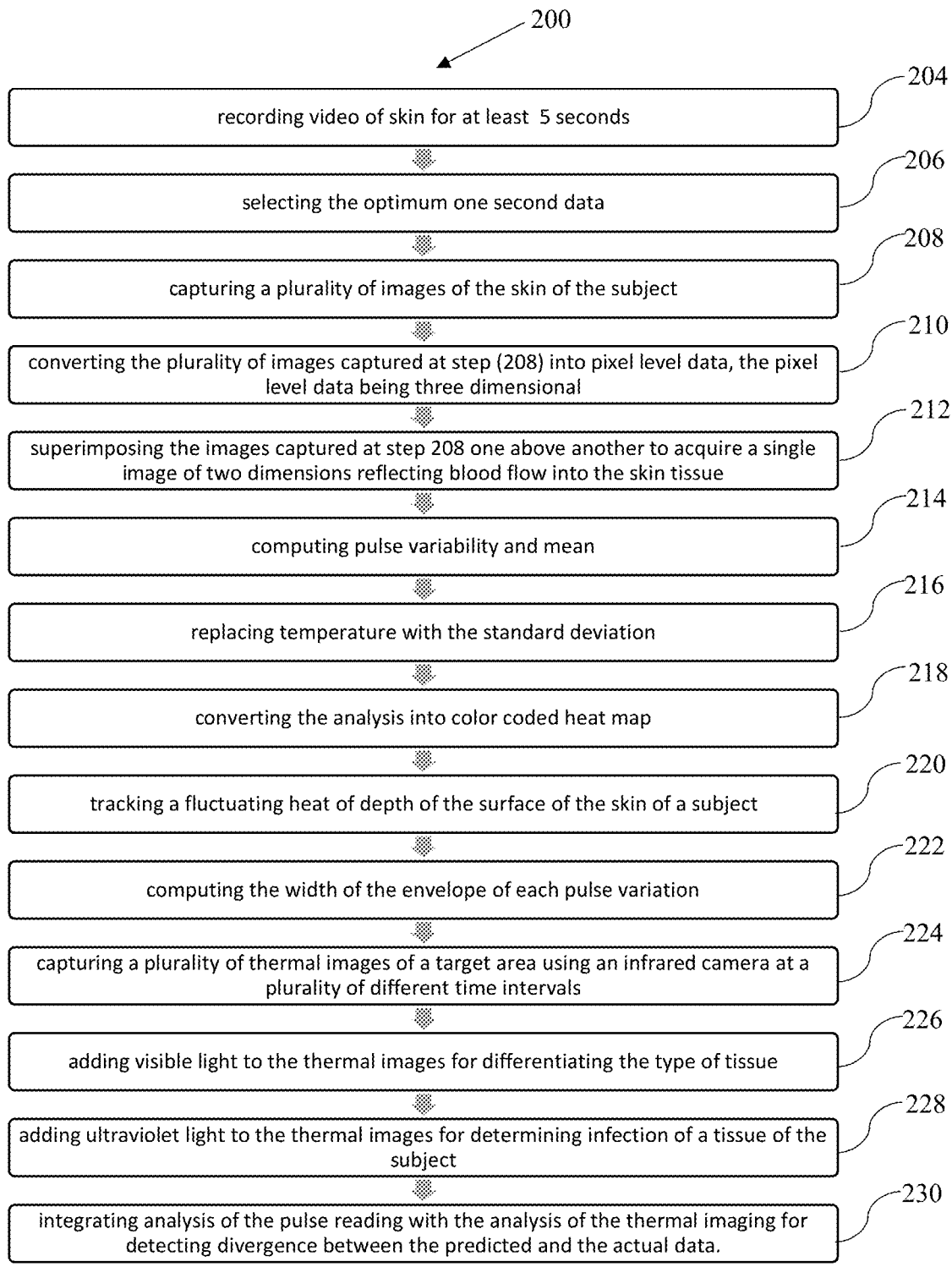

FIG. 2 illustrates an electronic method (200) for predicting clinical and non-clinical outcomes of a subject according to an embodiment herein. The method (200) comprising of measuring (201) the pulse reading of the heartbeat of the subject by: acquiring (102) an input of a photoplethysmography (PPG) sample in the form of peak(s) representing pulse(s) on X-axis and Y-axis. The method (200) further comprising normalizing (104) the Y-axis. The method (200) further comprising computing (106) median and standard deviation of height of all comparable points of the pulse. The method (200) further comprising identifying (108) start and end points of an individual pulse cycle. The method (200) further comprising breaking (110) the input sample into individual pulses. The method (200) further comprising computing (112) mean height of all points in each of the individual pulses. The method (200) further comprising validating (114) if mean of the individual pulses is out of the limit of the sample median with or without the standard deviation. The method (200) further comprising applying (116) kernel density estimates (KDE) on each of the individual pulse. The method (200) further comprising procuring (118) a plurality of summed points from all kernels obtained from the KDE. The method (200) further comprising continuing (120) step (118) for each of the individual pulses. The method (200) further comprising obtaining (122) mean KDE for all the individual pulses. The method (200) further comprising receiving (124) a summated pulse. The method (200) further comprising acquiring (202) a image of the body of the subject, the imaging by recording (204) video of skin for at least 5 seconds. The method (200) further comprising selecting (206) the optimum one second data. The method (200) further comprising capturing (208) a plurality of images of the skin of the subject. The method (200) further comprising converting (210) the plurality of images captured at step (208) into pixel level data, the pixel level data being three dimensional. The method (200) further comprising superimposing (212) the images captured at step (208) one above another to acquire a single image of two dimensions reflecting blood flow into the skin tissue. The method (200) further comprising computing (214) pulse variability and mean. The method (200) further comprising replacing (216) temperature with the standard deviation. The method (200) further comprising converting (218) the analysis into color coded heat map. The method (200) further comprising tracking (220) a fluctuating heat of depth of the surface of the skin of a subject. The method (200) further comprising computing (222) the width of the envelope of each pulse variation. The method (200) further comprising capturing (224) a plurality of images of a target area using an infrared camera at a plurality of different time intervals. The method (200) further comprising adding (226) visible light to the images for differentiating the type of tissue. The method (200) further comprising adding (228) ultraviolet light to the images for determining infection of a tissue of the subject and integrating (230) analysis of the pulse reading with the analysis of the imaging for detecting divergence between the predicted and the actual data.

In another embodiment of the method (200), wherein the image can be selected from a group of a light/visible image, thermal image, or an ultrasound image.

In another embodiment, the method (200) further comprises two dimensions with cells as variability in time. In yet another embodiment (200) further comprises image pulse of surface and fluctuating heat of depth covering both superficial and deep flow.

In addition, external factors (like room temperature, gravitational forces in space flight etc.), internal factors (like pain, fever, sepsis etc.) and emotional state of the person (like anger, stress, happiness etc.) affects pulse morphology and the speed of the volumetric blood flow. The rapid blood flow pushes the walls of the blood vessels harder, and the increased volume of heated blood flowing through the blood vessel raising the body temperature. Hence, monitoring the body temperature also plays a vital role in predicting more accurate physiological, pathological, and emotional states of the subject in addition to determining HRV. In yet another embodiment, Fragrance, taste, any sensual/sensuous pleasure eliciting response is predicted from analyzing PPG.

In another embodiment, the method (200) also includes measuring emissivity of bone, muscle, and skin through a patch. In another embodiment, method may be used to differential between several tissues, and between tissues and bones. The patch defines a plastic box material adjoining two films. One of the films may be configured to peel off giving underlying couture. Emissivity of bone, skin, and so on may differ if temperature is the same, however there may be a slight difference in image pattern in case of different temperatures. One film may be deformable to underlying tissue contour, labeled with a deforming design, can lead to recreation of contour by a two-dimensional image.

In yet another embodiment, the method (200) involves utilizing L-scale for imaging. The L-scale is configured to sense the room temperature and contact casing for determining temperature of the skin of the subject.

In yet another embodiment, the method (200) further comprises measuring the emissivity of bone, muscle, and skin.

In another embodiment, light images from video can be used instead of the images in the method (200).

Figure 6A:
FIGS. 6A, 6B, and 6C illustrate, predicting blood flow using a video or plurality of light images (6B), converting images into pixel level data of individual color spectrum of red, green and blue (RGB), analyzing variation in time of RGB components and plotting the pixel level standard deviation to reveal the area of RGB change over time, reflecting blood flow.
Figure 6B:
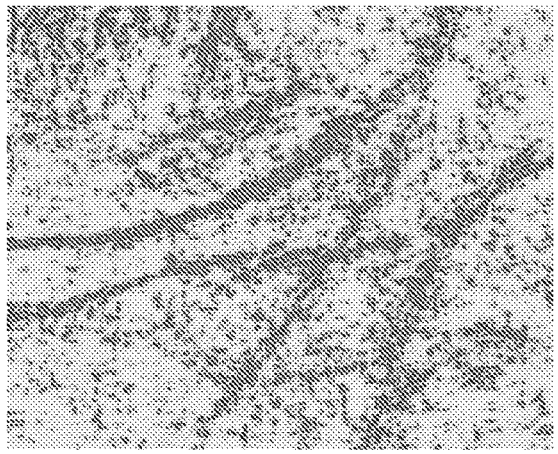
Figure 6C:
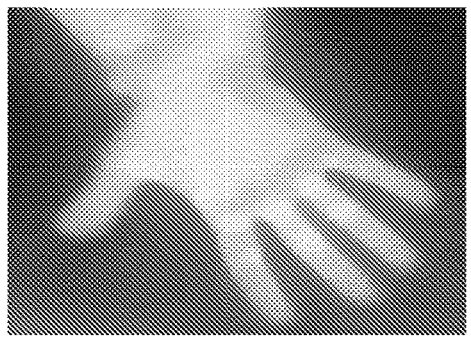

In another embodiment, the heart rate is measured by a device having a camera. In an embodiment, the device includes a mobile phone, a smart watch, and a photographic camera. In an embodiment, the heart rate is measured by a non-contact optical technique of photoplethysmography (PPG) or remote PPG. In an embodiment, a video of the target area is recorded and individual frames are analyzed for pixel data to determine RGB color change, which varies with blood flow, and thereby providing a pulse morphology with respect to time. In an embodiment, the photoplethysmography (PPG) is used to detect volumetric changes in the blood flow. In another embodiment, the photoplethysmography (PPG) is based on the principle that the blood absorbs more light than the surrounding tissues. In an embodiment, the blood flow affects the reflection of light. In an embodiment, the blood flow is different in systole and diastole. A difference in width of two PPG waves of a subject as shown in FIG. 4B (top tracing) and 4B (bottom tracing) indicating change in pathophysiological state of the tissue. FIG. 6A is a light image and change in RGB pattern reflects blood flow. FIG. 6B is a light image RGB frame with standard deviation of individual color change over time. The SD is coded as color heat map based on a value [such as if SD is more than 1, the pixel is coded Red, and less than 1 is coded Green]. FIG. 6B depicts the hand image showing the creases with blood flow matching the visible light image in FIG. 6A. Similar analysis can be conducted on a image video (FIG. 6C).

FIG. 5 illustrates a system (500) for determining the core body temperature of an individual, according to an embodiment. In an embodiment, the heart rate monitoring along with the imaging enables assessing the accurate temperature of the individual. In an embodiment, the heart rate monitoring along with the imaging enables eliminating the possibility of medications taken by an individual for a higher body temperature. The system (500) includes a pulse reading module (502), an imaging module (504), an EEG module (505), a quantification module (506), and an output module (508).

In another embodiment, the quantification module (506) communicates with the pulse reading module (502), the EEG module (505), and the imaging module (504). In an embodiment, the quantification module (506) is capable of processing the images and the pulse morphology. In another embodiment, the quantification module (506) analyses the input values received from the pulse reading module (502), the brain wave readings from the EEG module (505), and the images received from the imaging module (504). In another embodiment, the quantification module (506) of the individual by analyzing the input values received from the pulse reading module (502) and the images received from the imaging module (504). In another embodiment, the quantification module (506) analyses the data using computer algorithms of the individual by using the input values received from the pulse reading module (502) and the images received from the imaging module (504). Any disconnect between the predicted pulse for the actual temperature and the image-based temperature is flagged for further investigation. In another embodiment, the system further includes a face detection module (510).

The pulse reading module (502) measures the pulse morphology and pulse peak variation and width and the heart rate of the individual. The pulse reading module (502) measures the heart rate of the individual. The heart rate generally lies in the range from 60-100 beats per minute. In another embodiment, the heart rate increases when the temperature of the individual is increased as compared to the normal body temperature. In another embodiment, 1 degree increase in the body temperature leads to an increase in the heart rate by 10 beats per minute.

In another embodiment, the pulse reading module (502) is a device having a camera. In an embodiment, the pulse reading module (502) includes a mobile phone, a smart watch, and a photographic camera. In another embodiment, the heart rate is measured by an optical technique of photoplethysmography (PPG). In another embodiment, the photoplethysmography (PPG) is used to detect volumetric changes in the blood flow. In another embodiment, the photoplethysmography (PPG) is based on the principle that the flowing blood absorbs more light than the surrounding tissues. In another embodiment, the blood flow affects the reflection of light. In an embodiment, the blood flow is different in systole and diastole. In another embodiment, the red light is absorbed differently by oxygenated blood as compared to deoxygenated blood. In an embodiment the elevated levels of deoxygenated blood can predict disease. In an embodiment the elevated levels of deoxygenated blood can predict disease by a contactless method. In an embodiment the elevated levels of deoxygenated blood can predict Pulmonary diseases by a contactless method.

In another embodiment, the heart rate is measured by placing a finger on the camera of the pulse reading module (502). In another embodiment, the flashlight of the devices serves as the light source in the visible range for reflection by the blood cells of the individual. In an embodiment, the light reflected is different in systole and diastole. The pulse reading module (502) can assess the heart beats per minute. In an embodiment, the pulse reading module (502) helps in determining the core body temperature of the individual.

The imaging module (504) can capture images. In another n embodiment, the imaging module (504) is the infrared camera. In another embodiment, the body emits heat in the form of infrared rays. In another embodiment, the infrared rays are detected by the imaging module and the images are captured.

In another embodiment, the imaging module (504) is capable of recording video and the time-lapse photography in real-time. In another embodiment, the imaging module (504) utilizes a multi spectral dynamic imaging (MSX) technique. The multi spectral dynamic imaging (MSX) technique is based on FLIR processors for acquiring the images and the videos in real time. In another embodiment, the multi spectral dynamic imaging (MSX) technique overlays visible light images onto the images. In another embodiment, the visible light allows the better visualization of the images.

In another embodiment, the quantification module (506) communicates with the pulse reading module (502) and the imaging module (504). In another embodiment, the quantification module (506) is capable of processing the images and the pulse morphology. In another embodiment, the quantification module (506) analyses the input values received from the pulse reading module (502) and the images received from the imaging module (504). In another embodiment, the quantification module (506) of the individual by analyzing the input values received from the pulse reading module (502) and the images received from the imaging module (504). In another embodiment, the quantification module (506) analyses the data using computer algorithms of the individual by using the input values received from the pulse reading module (502) and the images received from the imaging module (504). Any disconnect between the predicted pulse for the actual temperature and the image-based temperature is flagged for further investigation. In an embodiment, the system further includes a face detection module (510).

In another embodiment, the output module (508) communicates with the quantification module (506) to predict the physiological state of the individual. The output module is capable of displaying divergence between actual and predicted dataset of the variations of individual pulses. The present embodiment may further include capturing facial patterns of the subject by detecting, tracking, and recognizing thereof using algorithm techniques such as deep learning and machine learning.

Figure 7:
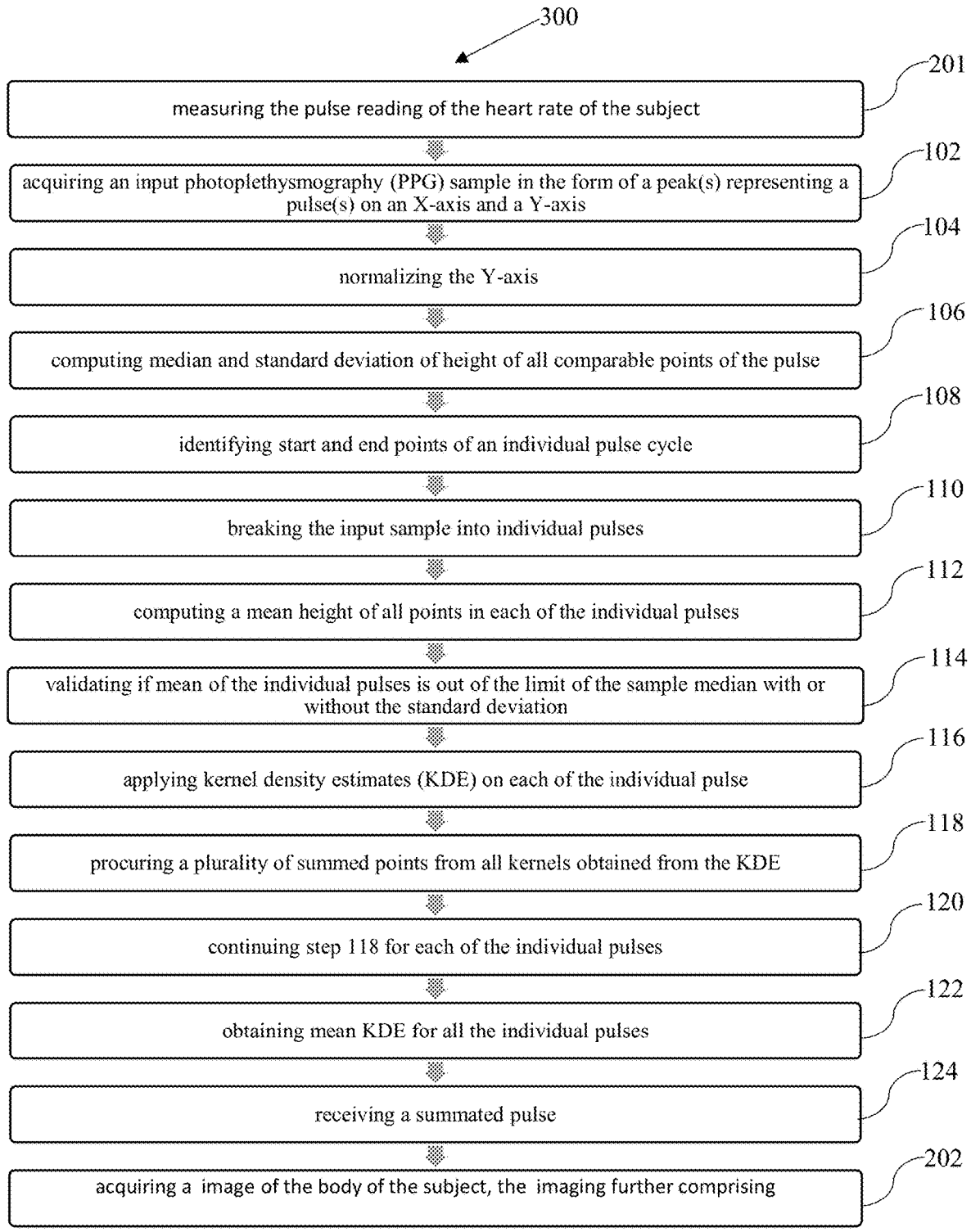
FIG. 7 illustrates a flowchart depicting another method (300) for predicting clinical and non-clinical outcomes of a subject is provided, according to another embodiment herein.
Figure 7:
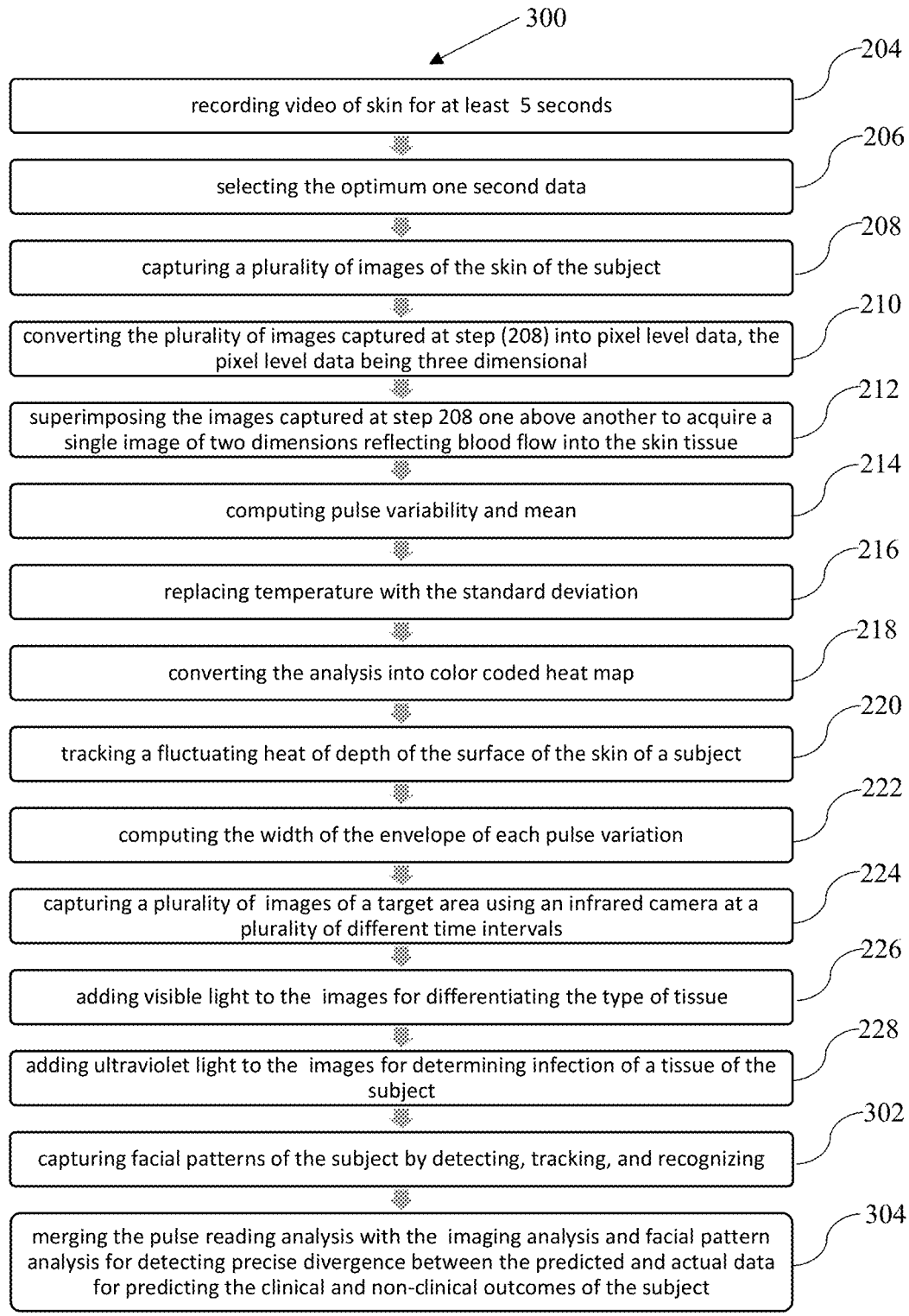

FIG. 7 illustrates another method (300) for predicting clinical and non-clinical outcomes of a subject, according to an embodiment herein. The method (300) comprising of measuring (201) the pulse reading of the heartbeat of the subject by: acquiring (102) an input of a photoplethysmography (PPG) sample in the form of peak(s) representing pulse(s) on X-axis and Y-axis. The method (300) further comprising normalizing (104) the Y-axis. The method (300) further comprising computing (106) median and standard deviation of height of all comparable points of the pulse. The method (300) further comprising identifying (108) start and end points of an individual pulse cycle. The method (300) further comprising breaking (110) the input sample into individual pulses. The method (300) further comprising computing (112) mean height of all points in each of the individual pulses. The method (300) further comprising validating (114) if mean of the individual pulses is out of the limit of the sample median with or without the standard deviation. The method (300) further comprising applying (116) kernel density estimates (KDE) on each of the individual pulse. The method (300) further comprising procuring (118) a plurality of summed points from all kernels obtained from the KDE. The method (300) further comprising continuing (120) step (118) for each of the individual pulses. The method (300) further comprising obtaining (122) mean KDE for all the individual pulses. The method (300) further comprising receiving (124) a summated pulse. The method (300) further comprising acquiring (202) a image of the body of the subject, the imaging by recording (204) video of skin for at least 5 seconds. The method (300) further comprising selecting (206) the optimum one second data. The method (300) further comprising capturing (208) a plurality of images of the skin of the subject. The method (300) further comprising converting (210) the plurality of images captured at step (208) into pixel level data, the pixel level data being three dimensional. The method (300) further comprising superimposing (212) the images captured at step (208) one above another to acquire a single image of two dimensions reflecting blood flow into the skin tissue. The method (300) further comprising computing (214) pulse variability and mean. The method (300) further comprising replacing (216) temperature with the standard deviation. The method (300) further comprising converting (218) the analysis into color coded heat map. The method (300) further comprising tracking (220) a fluctuating heat of depth of the surface of the skin of a subject. The method (300) further comprising computing (222) the width of the envelope of each pulse variation. The method (300) further comprising capturing (224) a plurality of images of a target area using an infrared camera at a plurality of different time intervals. The method (300) further comprising adding (226) visible light to the images for differentiating the type of tissue. The method (300) further comprising adding (228) ultraviolet light to the images for determining infection of a tissue of the subject. The method (300) further comprises capturing (302) facial patterns of the subject by detecting, tracking, and recognizing thereof, and merging (304) the pulse reading analysis with the imaging analysis and facial pattern analysis for detecting precise divergence between the predicted and actual data for predicting the clinical and non-clinical outcomes of the subject.

Figure 8:
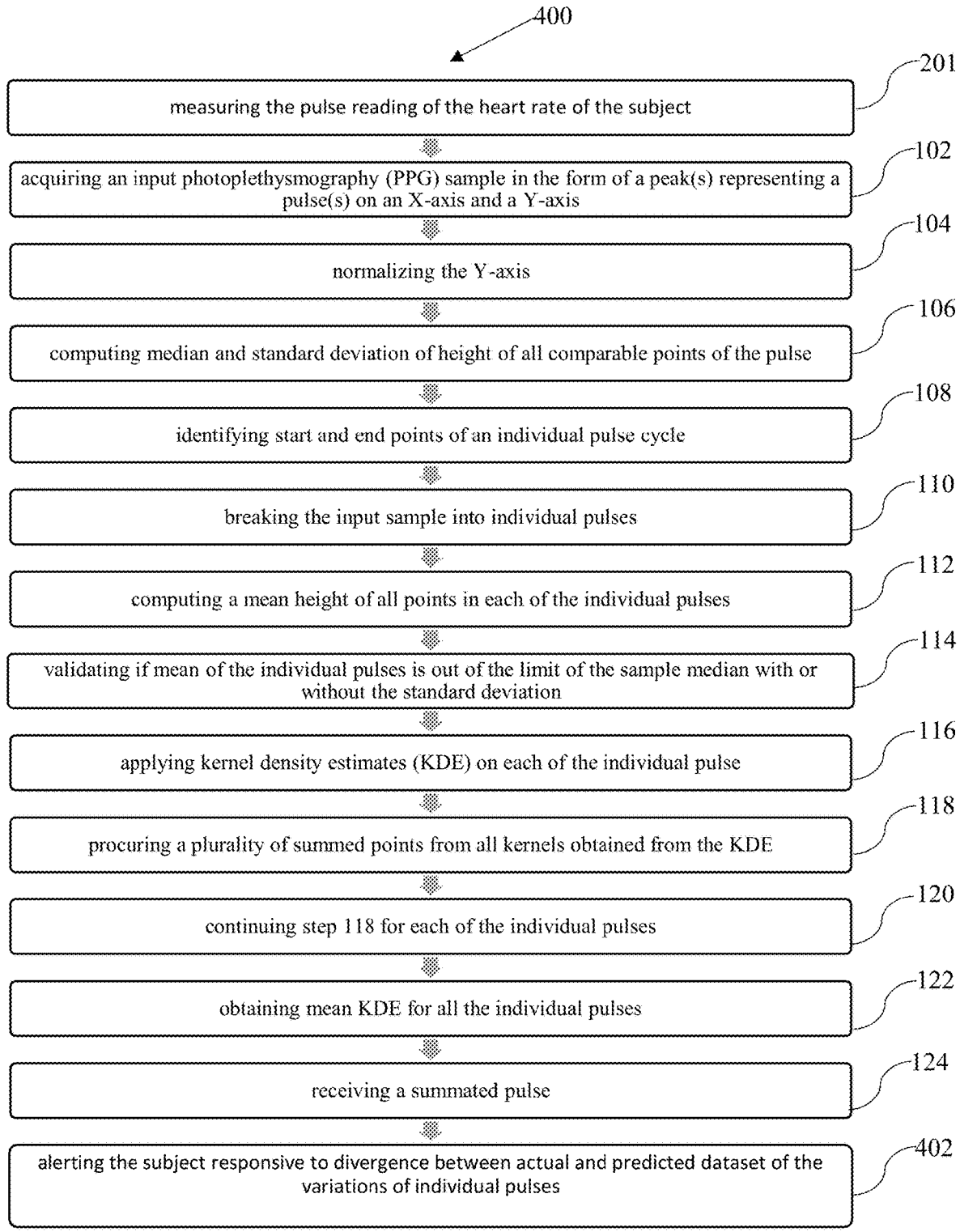
FIG. 8 illustrates a flowchart depicting an electronic method (400) for determining drowsiness or alertness level or fatigue of a subject is provided, according to another embodiment herein.

FIG. 8 illustrates an electronic method (400) for determining drowsiness or alertness level or fatigue of a subject, according to an embodiment herein. The method (400) comprising of measuring (201) the pulse reading of the heartbeat of the subject by: acquiring (102) an input of a photoplethysmography (PPG) sample in the form of peak(s) representing pulse(s) on X-axis and Y-axis. The method (400) further comprising normalizing (104) the Y-axis. The method (400) further comprising computing (106) median and standard deviation of height of all comparable points of the pulse. The method (400) further comprising identifying (108) start and end points of an individual pulse cycle. The method (400) further comprising breaking (110) the input sample into individual pulses. The method (400) further comprising computing (112) mean height of all points in each of the individual pulses. The method (400) further comprising validating (114) if mean of the individual pulses is out of the limit of the sample median with or without the standard deviation. The method (400) further comprising applying (116) kernel density estimates (KDE) on each of the individual pulse. The method (400) further comprising procuring (118) a plurality of summed points from all kernels obtained from the KDE. The method (400) further comprising continuing (120) step (118) for each of the individual pulses. The method (400) further comprising obtaining (122) mean KDE for all the individual pulses. The method (400) further comprising receiving (124) a summated pulse, and alerting (402) the subject responsive to divergence between actual and predicted dataset of the variations of individual pulses.

In yet another embodiment, the method (400) further comprises acquiring a video of the pulse of the subject. In yet another embodiment, the method (400) further comprises acquiring images of the subject. In yet another embodiment, the method (400) further comprises detecting and tracking facial patterns of the subject.

Figure 9:
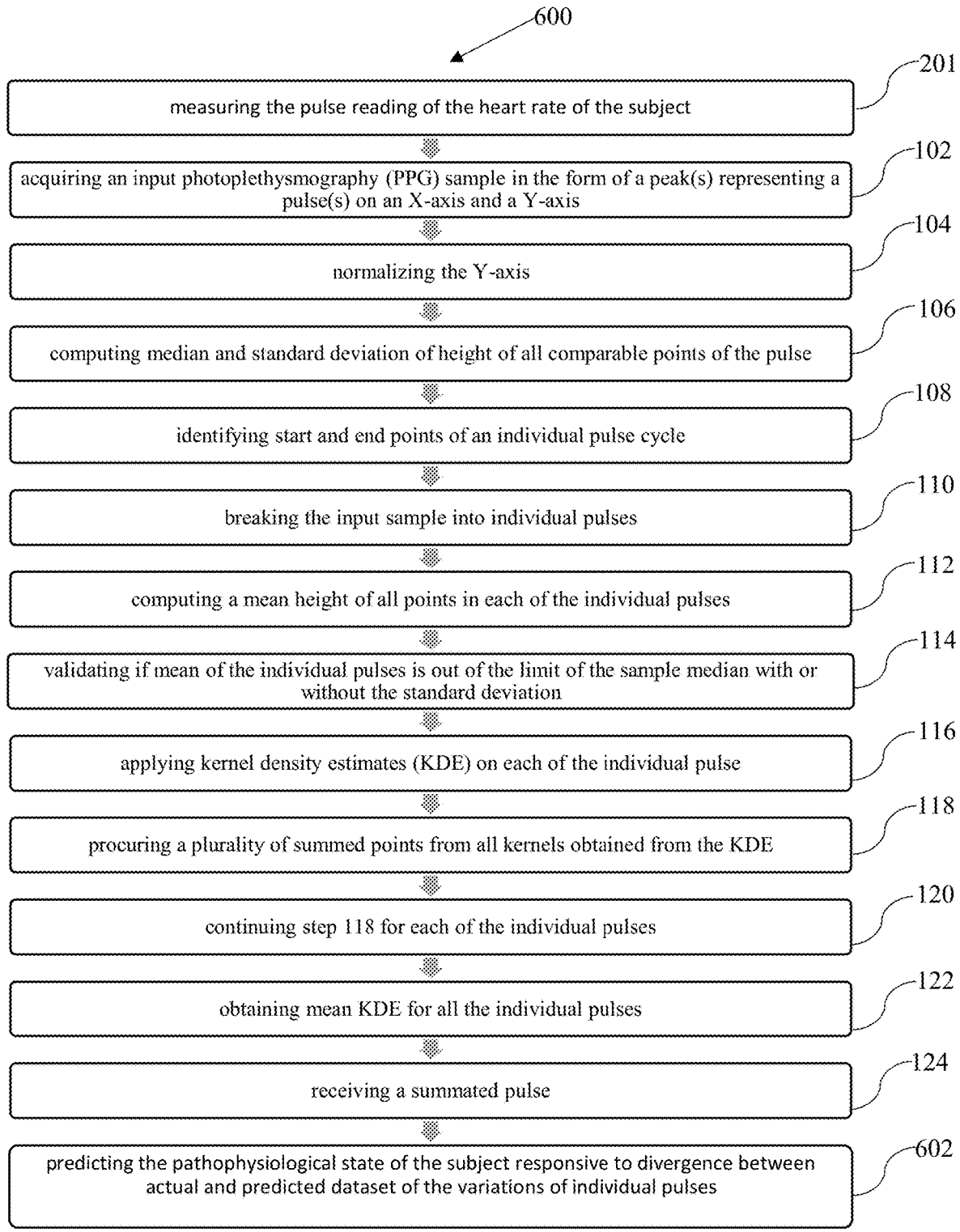
FIG. 9 illustrates a flowchart depicting an electronic method (600) for determining pathophysiological state of a subject is provided, according to another embodiment herein.

FIG. 9 illustrates an electronic method (600) for pathophysiological state of a subject, according to an embodiment herein. The method (600) comprising of measuring (201) the pulse reading of the heartbeat of the subject by: acquiring (102) an input of a photoplethysmography (PPG) sample in the form of peak(s) representing pulse(s) on X-axis and Y-axis. The method (600) further comprising normalizing (104) the Y-axis. The method (600) further comprising computing (106) median and standard deviation of height of all comparable points of the pulse. The method (600) further comprising identifying (108) start and end points of an individual pulse cycle. The method (600) further comprising breaking (110) the input sample into individual pulses. The method (600) further comprising computing (112) mean height of all points in each of the individual pulses. The method (600) further comprising validating (114) if mean of the individual pulses is out of the limit of the sample median with or without the standard deviation. The method (600) further comprising applying (116) kernel density estimates (KDE) on each of the individual pulse. The method (600) further comprising procuring (118) a plurality of summed points from all kernels obtained from the KDE. The method (600) further comprising continuing (120) step (118) for each of the individual pulses. The method (600) further comprising obtaining (122) mean KDE for all the individual pulses. The method (600) further comprising receiving (124) a summated pulse, and predicting (602) the pathophysiological state of the subject responsive to divergence between actual and predicted dataset of the variations of individual pulses.

In yet another embodiment, the method (600) further comprises acquiring a video of the pulse of the subject. In yet another embodiment, the method (600) further comprises acquiring images of the subject. In yet another embodiment, the method (600) further comprises detecting and tracking facial patterns of the subject.

Figure 10:
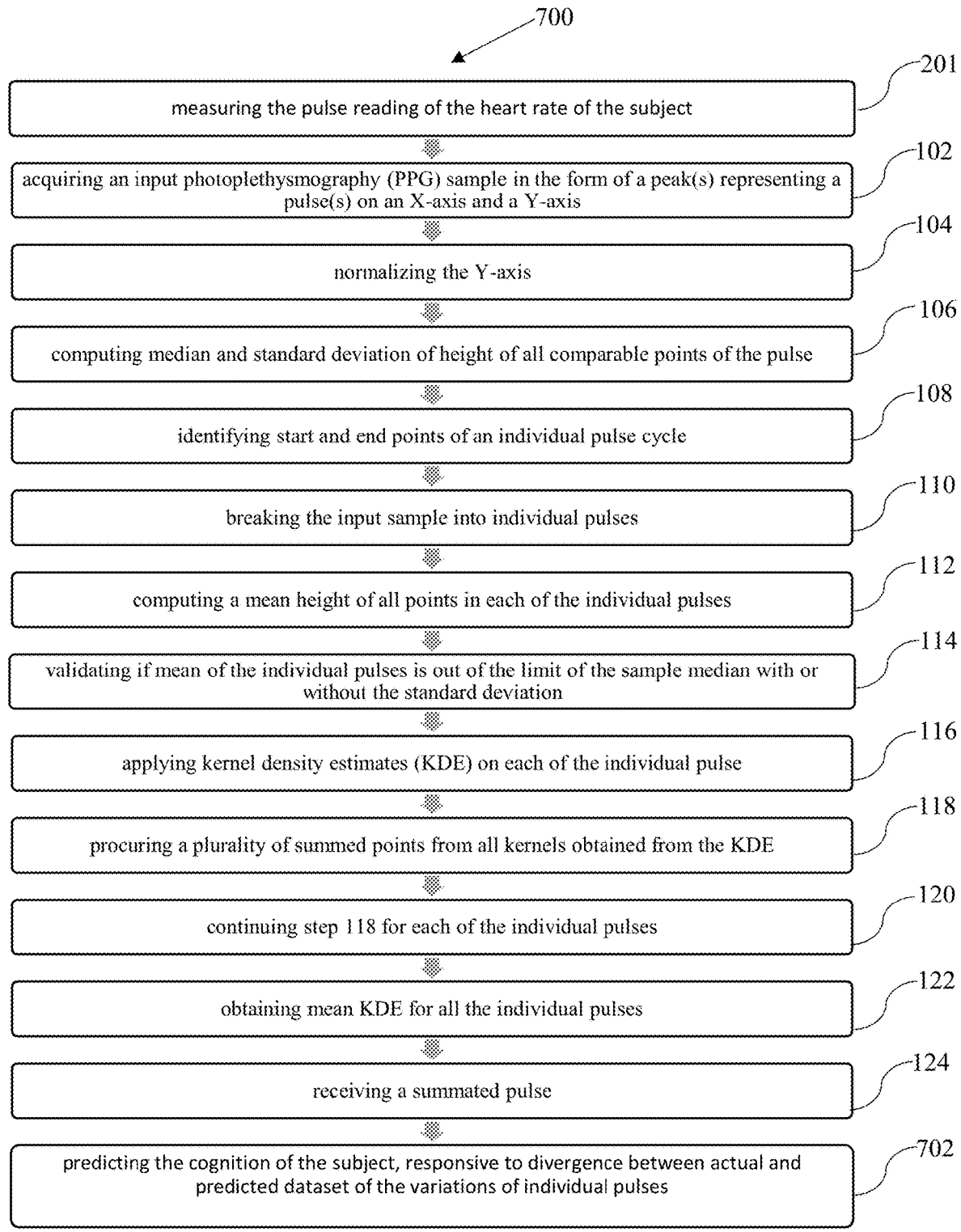
FIG. 10 illustrates a flowchart depicting an electronic method (700) for deciphering cognitive state of a subject is provided, according to an embodiment herein.

FIG. 10 illustrates an electronic method (700) for deciphering cognitive state of a subject, according to an embodiment herein. The method (700) comprising of measuring (201) the pulse reading of the heartbeat of the subject by: acquiring (102) an input of a photoplethysmography (PPG) sample in the form of peak(s) representing pulse(s) on X-axis and Y-axis. The method (700) further comprising normalizing (104) the Y-axis. The method (700) further comprising computing (106) median and standard deviation of height of all comparable points of the pulse. The method (700) further comprising identifying (108) start and end points of an individual pulse cycle. The method (700) further comprising breaking (110) the input sample into individual pulses. The method (700) further comprising computing (112) mean height of all points in each of the individual pulses. The method (700) further comprising validating (114) if mean of the individual pulses is out of the limit of the sample median with or without the standard deviation. The method (700) further comprising applying (116) kernel density estimates (KDE) on each of the individual pulse. The method (700) further comprising procuring (118) a plurality of summed points from all kernels obtained from the KDE. The method (700) further comprising continuing (120) step (118) for each of the individual pulses. The method (700) further comprising obtaining (122) mean KDE for all the individual pulses. The method (700) further comprising receiving (124) a summated pulse, and predicting (702) the cognitive state of the subject, responsive to divergence between actual and predicted dataset of the variations of individual pulses.

In yet another embodiment, the method (700) further comprises acquiring a video of the pulse of the subject. In yet another embodiment, the method (700) further comprises acquiring images of the subject. In yet another embodiment, the method (700) further comprises detecting and tracking facial patterns of the subject.

Figure 11:
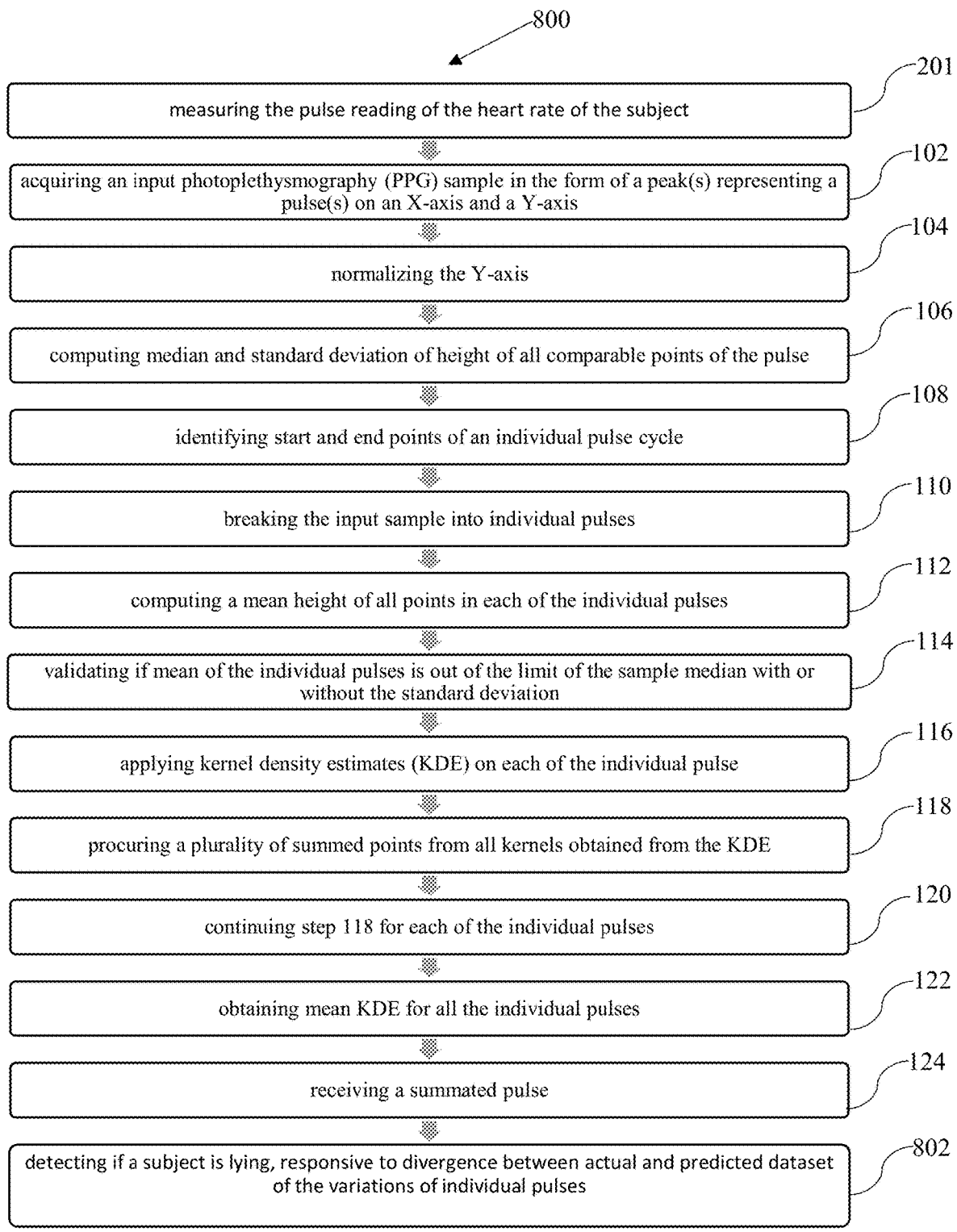
FIG. 11 illustrates a flowchart depicting an electronic method (800) for detecting lies is provided, according to an embodiment herein.

FIG. 11 illustrates an electronic method (800) for detecting lies, according to an embodiment herein. The method (800) comprising of measuring (201) the pulse reading of the heartbeat of the subject by: acquiring (102) an input of a photoplethysmography (PPG) sample in the form of peak(s) representing pulse(s) on X-axis and Y-axis. The method (800) further comprising normalizing (104) the Y-axis. The method (800) further comprising computing (106) median and standard deviation of height of all comparable points of the pulse. The method (800) further comprising identifying (108) start and end points of an individual pulse cycle. The method (800) further comprising breaking (110) the input sample into individual pulses. The method (800) further comprising computing (112) mean height of all points in each of the individual pulses. The method (800) further comprising validating (114) if mean of the individual pulses is out of the limit of the sample median with or without the standard deviation. The method (800) further comprising applying (116) kernel density estimates (KDE) on each of the individual pulse. The method (800) further comprising procuring (118) a plurality of summed points from all kernels obtained from the KDE. The method (800) further comprising continuing (120) step (118) for each of the individual pulses. The method (800) further comprising obtaining (122) mean KDE for all the individual pulses. The method (800) further comprising receiving (124) a summated pulse and detecting (802) if a subject is lying, responsive to divergence between actual and predicted dataset of the variations of individual pulses.

In yet another embodiment, the method (800) further comprises acquiring a video of the pulse of the subject. In yet another embodiment, the method (800) further comprises acquiring images of the subject. In yet another embodiment, the method (800) further comprises detecting and tracking facial patterns of the subject.

Figure 12:
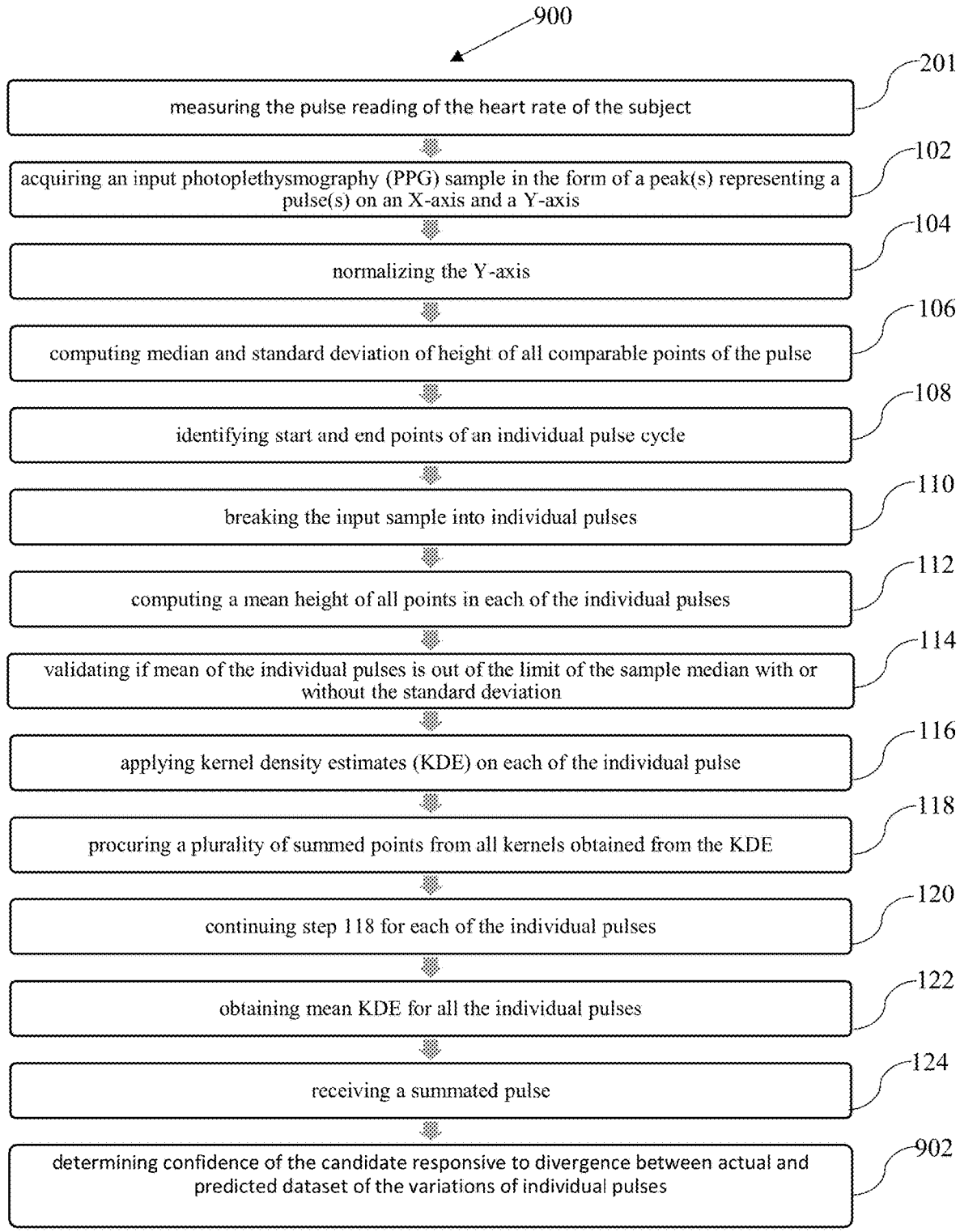
FIG. 12 illustrates a flowchart depicting an electronic method (900) for tracking confidence of a subject is provided, according to another embodiment herein.

FIG. 12 illustrates an electronic method (900) for detecting lies, according to an embodiment herein. The method (900) comprising of measuring (201) the pulse reading of the heartbeat of the subject by: acquiring (102) an input of a photoplethysmography (PPG) sample in the form of peak(s) representing pulse(s) on X-axis and Y-axis. The method (900) further comprising normalizing (104) the Y-axis. The method (900) further comprising computing (106) median and standard deviation of height of all comparable points of the pulse. The method (900) further comprising identifying (108) start and end points of an individual pulse cycle. The method (900) further comprising breaking (110) the input sample into individual pulses. The method (900) further comprising computing (112) mean height of all points in each of the individual pulses. The method (900) further comprising validating (114) if mean of the individual pulses is out of the limit of the sample median with or without the standard deviation. The method (900) further comprising applying (116) kernel density estimates (KDE) on each of the individual pulse. The method (900) further comprising procuring (118) a plurality of summed points from all kernels obtained from the KDE. The method (900) further comprising continuing (120) step (118) for each of the individual pulses. The method (900) further comprising obtaining (122) mean KDE for all the individual pulses. The method (900) further comprising receiving (124) a summated pulse and determining (902) confidence of the subject responsive to divergence between actual and predicted dataset of the variations of individual pulses.

In yet another embodiment, the method (900) further comprises acquiring a video of the pulse of the subject. In yet another embodiment, the method (900) further comprises acquiring images of the subject. In yet another embodiment, the method (900) further comprises detecting and tracking facial patterns of the subject.

Figure 13:
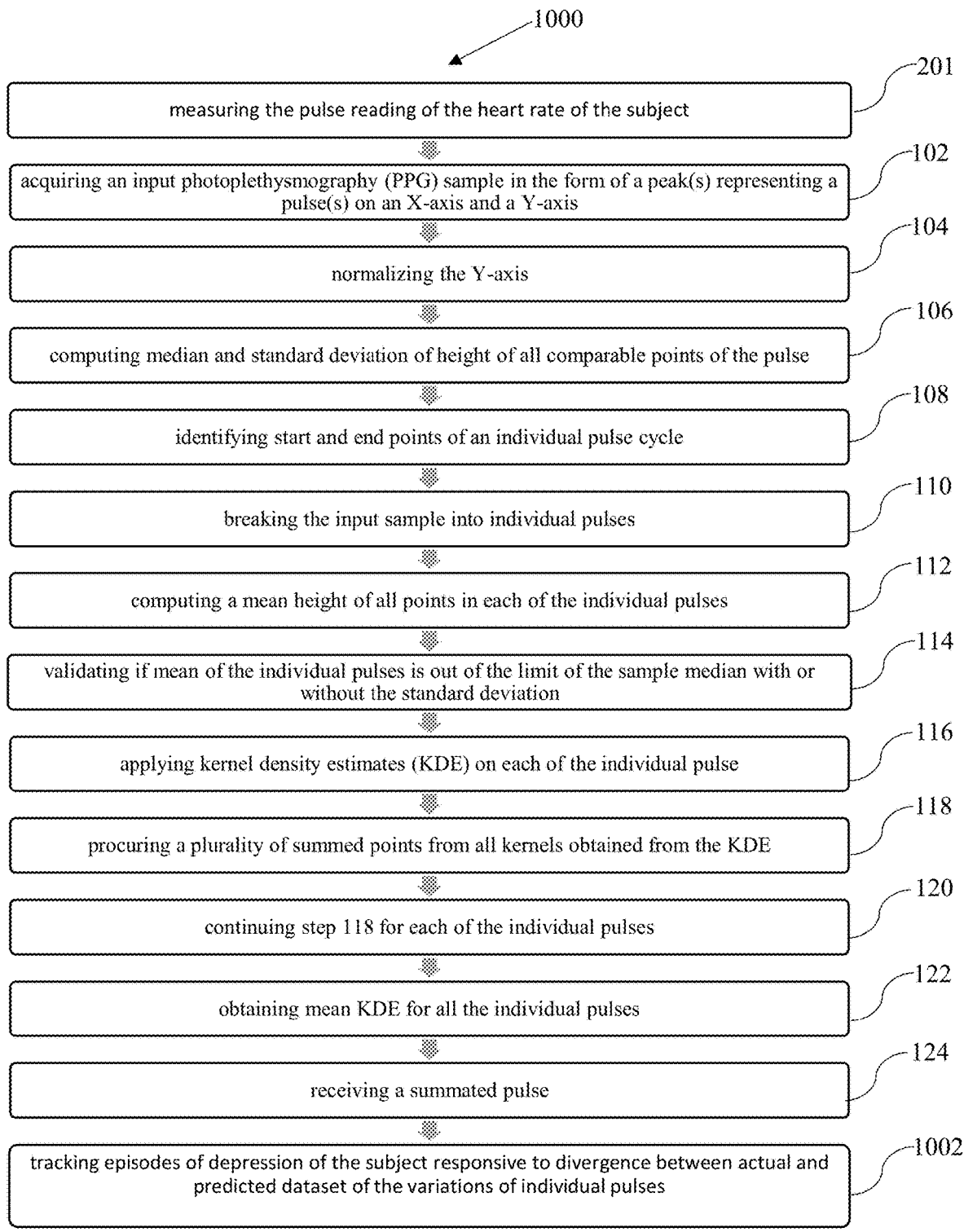
FIG. 13 illustrates a flowchart depicting an electronic method (1000) for tracking episodes of depression of a subject is provided, according to another embodiment herein.

FIG. 13 illustrates an electronic method (1000) for tracking episodes of depression of a subject, according to an embodiment herein. The method (1000) comprising of measuring (201) the pulse reading of the heartbeat of the subject by: acquiring (102) an input of a photoplethysmography (PPG) sample in the form of peak(s) representing pulse(s) on X-axis and Y-axis. The method (1000) further comprising normalizing (104) the Y-axis. The method (1000) further comprising computing (106) median and standard deviation of height of all comparable points of the pulse. The method (1000) further comprising identifying (108) start and end points of an individual pulse cycle. The method (1000) further comprising breaking (110) the input sample into individual pulses. The method (1000) further comprising computing (112) mean height of all points in each of the individual pulses. The method (1000) further comprising validating (114) if mean of the individual pulses is out of the limit of the sample median with or without the standard deviation. The method (1000) further comprising applying (116) kernel density estimates (KDE) on each of the individual pulse. The method (1000) further comprising procuring (118) a plurality of summed points from all kernels obtained from the KDE. The method (1000) further comprising continuing (120) step (118) for each of the individual pulses. The method (1000) further comprising obtaining (122) mean KDE for all the individual pulses. The method (1000) further comprising receiving (124) a summated pulse, and tracking (1002) episodes of depression of the subject responsive to divergence between actual and predicted dataset of the variations of individual pulses.

In yet another embodiment, the method (1000) further comprises acquiring a video of the pulse of the subject. In yet another embodiment, the method (1000) further comprises acquiring images of the subject. In yet another embodiment, the method (1000) further comprises detecting and tracking facial patterns of the subject.

Figure 14:
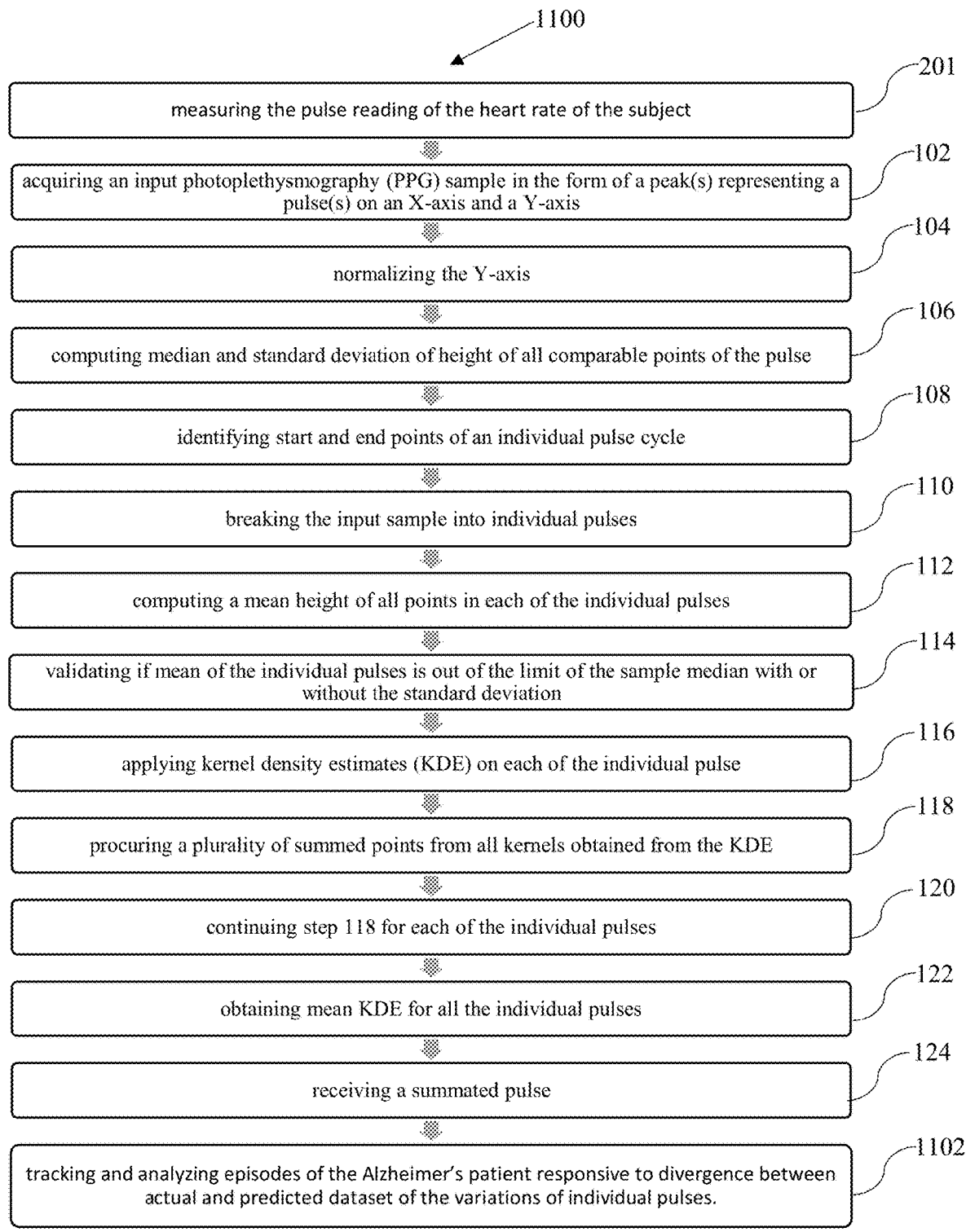
FIG. 14 illustrates a flowchart depicting an electronic method (1100) for tracking and analyzing episodes of psychological crisis and its response to therapy is provided, according to another embodiment herein.

A psychological crisis is a life event that an individual perceives as stressful to the extent that normal coping mechanisms are insufficient. Different patient responds differently to various therapies used by psychologists. FIG. 14 illustrates an electronic method (1100) for tracking and analyzing episodes of psychological crisis and its response to therapy is provided, according to an embodiment herein. The method (1100) comprising of measuring (201) the pulse reading of the heartbeat of the subject by: acquiring (102) an input of a photoplethysmography (PPG) sample in the form of peak(s) representing pulse(s) on X-axis and Y-axis. The method (1100) further comprising normalizing (104) the Y-axis. The method (1100) further comprising computing (106) median and standard deviation of height of all comparable points of the pulse. The method (1100) further comprising identifying (108) start and end points of an individual pulse cycle. The method (1100) further comprising breaking (110) the input sample into individual pulses. The method (1100) further comprising computing (112) mean height of all points in each of the individual pulses. The method (1100) further comprising validating (114) if mean of the individual pulses is out of the limit of the sample median with or without the standard deviation. The method (1100) further comprising applying (116) kernel density estimates (KDE) on each of the individual pulse. The method (1100) further comprising procuring (118) a plurality of summed points from all kernels obtained from the KDE. The method (1100) further comprising continuing (120) step (118) for each of the individual pulses. The method (1100) further comprising obtaining (122) mean KDE for all the individual pulses. The method (1100) further comprising receiving (124) a summated pulse, and tracking (1102) and analyzing episodes of psychological crisis and its response to therapy responsive based on divergence between actual and predicted dataset of the variations of individual pulses.

In yet another embodiment, the method (1100) further comprises acquiring a video of the pulse of the subject. In yet another embodiment, the method (1100) further comprises acquiring images of the subject. In yet another embodiment, the method (1100) further comprises detecting and tracking facial patterns of the subject.

Figure 15:
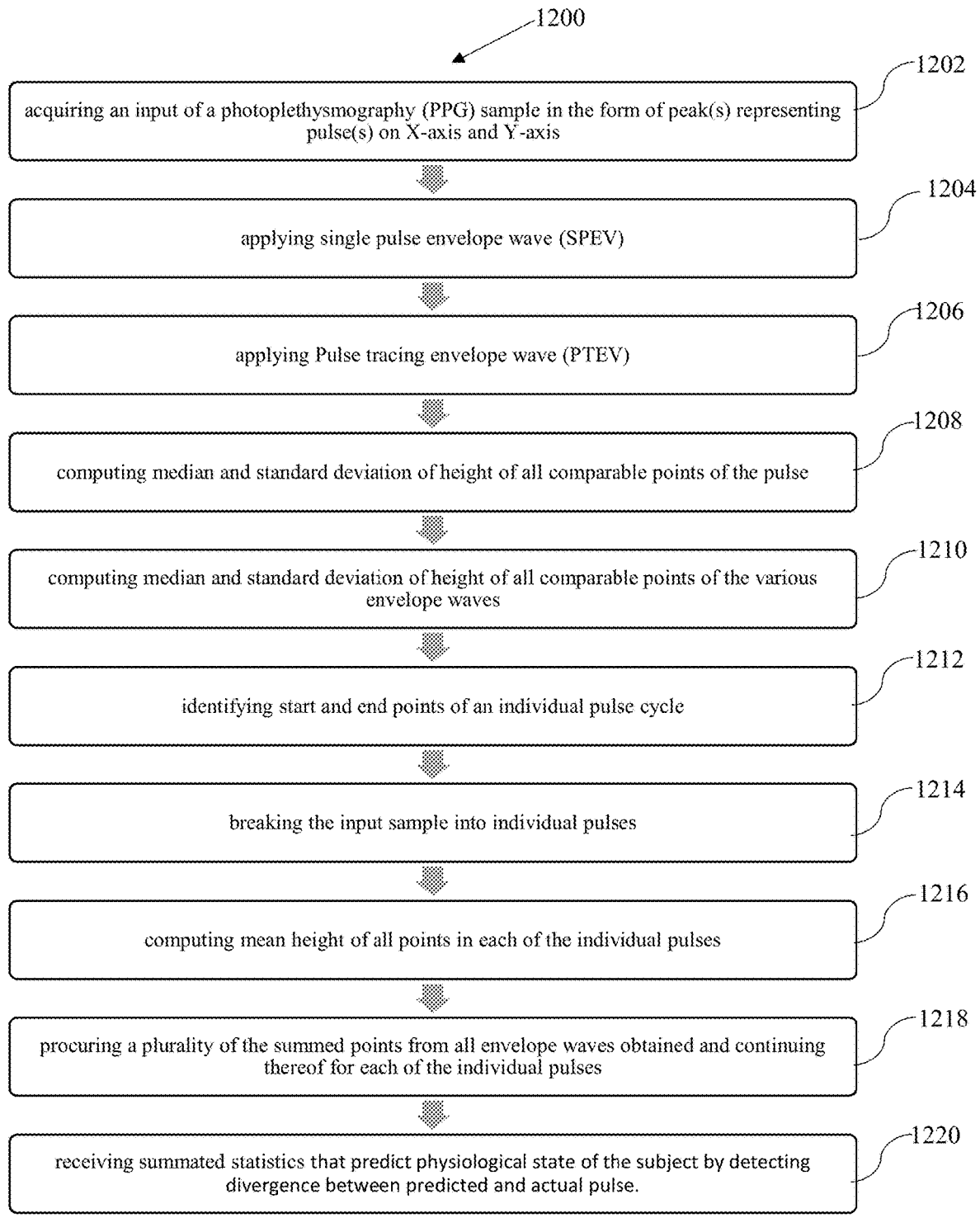
FIG. 15 illustrates a flowchart depicting an electronic method (1200) for predicting physiological states of a subject is provided, according to another embodiment herein.

FIG. 15 illustrates another method (1200) for predicting physiological states of a subject, according to an embodiment herein. The method (1200) comprising acquiring (1202) an input of a photoplethysmography (PPG) sample in the form of peak(s) representing pulse(s) on X-axis and Y-axis. The method (1200) further comprising, applying (1204) single pulse envelope wave (SPEV). The method (1200) further comprising, applying (1206) Pulse tracing envelope wave (PTEV). The method (1200) further comprising, computing (1208) median and standard deviation of height of all comparable points of the pulse. The method (1200) further comprising, computing (1210) median and standard deviation of height of all comparable points of the various envelope waves. The method (1200) further comprising, identifying (1212) start and end points of an individual pulse cycle, The method (1200) further comprising, breaking (1214) the input sample into individual pulses. The method (1200) further comprising, computing (1216) mean height of all points in each of the individual pulses. The method (1200) further comprising, procuring (1218) a plurality of the summed points from all envelope waves obtained and continuing thereof for each of the individual pulses and receiving (1220) summated statistics that predicts physiological state of the subject by detecting divergence between predicted and actual statistics.

In yet another embodiment, an electronic method for determining drowsiness or alertness level or fatigue of a subject is provided herein. The method includes measuring the pulse reading of the heartbeat of the subject. The pulse reading involves processing each of the individual pulse morphology of a single pulse from the sample data of PPG, applying "single pulse envelope wave" (SPEV), Pulse tracing envelope wave (PTEV), applying kernel density estimates (KDE) on each of the individual pulses, and analyzing thereof for determining drowsiness or alertness level or fatigue of a subject instantly.

In another embodiment, a system for predicting clinical and non-clinical outcomes of a subject. The system includes a pulse reading module capable of determining the heart rate; a imaging module capable of capturing images of a target area; and a quantification module communicating with the pulse reading module and the imaging module. The quantification module is capable of processing the heart rate and the images for determining the core body temperature. The system also includes an output module communicating with the quantification module. The output module can display divergence between actual and predicted dataset of the variations of individual pulses.

In another embodiment, an electronic method for determining pathophysiological state of a subject is disclosed herein. The method includes measuring the pulse reading of the subject. The pulse reading involves processing each of the individual peaks of the pulses of the sample data of PPG, applying "single pulse envelope wave" (SPEV), Pulse tracing envelope wave (PTEV), applying kernel density estimates (KDE) on each of the individual pulses, and analyzing thereof for predicting the physiological state instantly.

In another embodiment, an electronic method for deciphering cognitive state of a subject is disclosed herein. The method includes measuring the pulse reading of the heartbeat of the subject. The pulse reading involves processing each of the individual peaks of the pulses of the sample data of PPG, applying single pulse envelope wave (SPEV), Pulse tracing envelope wave (PTEV), applying kernel density estimates (KDE) on each of the individual pulses, and analyzing thereof for predicting the cognitive state of the subject responsive to divergence between actual and predicted dataset of the variations of individual pulses.

In yet another embodiment, an electronic method for detecting lies is disclosed herein. The method includes measuring the pulse reading of the heartbeat of the subject. The pulse reading involves processing each of the individual peaks of the pulses of the sample data of PPG, applying "single pulse envelope wave" (SPEV), Pulse tracing envelope wave (PTEV), applying kernel density estimates (KDE) on each of the individual pulses, and analyzing thereof for detecting if a subject is lying responsive to divergence between actual and predicted dataset of the variations of individual pulses.

In another embodiment, an electronic method for tracking confidence of a subject is disclosed herein. The method includes measuring the pulse reading of the heartbeat of the subject. The pulse reading involves processing each of the individual peaks of the pulses of the sample data of PPG, applying single pulse envelope wave (SPEV), Pulse tracing envelope wave (PTEV), applying kernel density estimates (KDE) on each of the individual pulses, and analyzing thereof for determining the confidence of the subject responsive to the divergence between actual and predicted dataset of the variations of individual pulses.

In yet another embodiment, an electronic method for tracking episodes of depression of a subject is disclosed herein. The method includes measuring the pulse reading of the heartbeat of the subject. The pulse reading involves processing each of the individual peaks of the pulses of the sample data of PPG, applying single pulse envelope wave (SPEV), Pulse tracing envelope wave (PTEV), applying kernel density estimates (KDE) on each of the individual pulses, and analyzing thereof for tracking episodes of depression of the subject responsive to divergence between actual and predicted dataset of the variations of individual pulses.

In yet another embodiment, an electronic method and system for early sepsis detection by measuring blood pressure and heart rate variations as determined using the method and systems to analyze PPG pulse according to the present embodiment is provided.

In yet another embodiment, an electronic method and system for early prediction of cardiac arrest by measuring blood pressure and heart rate variations as determined using the method and systems to analyze PPG pulse according to the present embodiment is provided.

In an embodiment, a wearable device to deploy systems and method as disclosed herein to measure/analyze/determine PPG parameters within a single pulse is provided. The wearable device may be a wristband or watch or a smart fabric, or a headband or any device/apparatus/system that may be put in contact with body of a user/subject to obtain PPG data. The device may be used further for monitoring epilepsy and seizures.

In yet another embodiment, the present methods and systems as described in FIG. 2 specifically may be used to compute an interpersonal reactivity index. This can be used to measure/determine a subject's emotions towards each other based on variation determined within a PPG pulse.

In yet another embodiment, an electronic method of measuring blood pressure in a contactless manner of a subject is provided by measuring/monitoring/analyzing PPG pulse as described herein. In yet another aspect, an electronic method of evaluating retinal blood vessels and microcirculation in a contactless manner of a subject is provided by measuring/monitoring/analyzing PPG pulse as described herein. The clear view of retina will lead to contactless evaluation by above mentioned method of the retinal blood vessel disease is a significant advance over the existing methods.

In yet another aspect, an electronic method of evaluating mucosal blood vessels and microcirculation in a contactless manner of a subject is provided by measuring/monitoring/analyzing PPG pulse as described herein. The clear view of mucosa during endoscopy and surgery will lead to contactless evaluation by above mentioned method of the mucosal blood vessel disease is a significant advancement over the existing methods.

In yet another embodiment, an electronic method to grade a user or subject's image according to Cormack-Lehane scale or grade is provided. The method and systems thereof allow simulating scenarios that a patient may face on account of using a certain anesthetic agent. The images so obtained may be trained or be processed to obtain PPG pulse data according to an embodiment as described herein.

In yet another embodiment, an electronic method to perform Venous muscle pump test (VMPT), in which the patient executes calf extension while sitting, measures the venous refilling time (VRT), after the venous blood filling is decreased through muscle compression. The refilling time is much shorter in case of unhealthy venous valves due to pathologic reflux. Individuals with VRT longer than 20 seconds are interpreted to have healthy venous valves. The emptied veins of the leg refill with time by blood coming in from the capillaries. The time taken for the veins to refill, namely, venous refilling time is then measured. The volume of blood pumped out can provide a measure of the capacity of the muscle to pump out blood. The pulse reading involves processing each of the individual peaks of the pulses of the sample data of PPG, applying single pulse envelope wave (SPEV), Pulse tracing envelope wave (PTEV), applying kernel density estimates (KDE) on each of the individual pulses, and analyzing thereof for tracking venous refilling time of the subject responsive to divergence between actual and predicted dataset of the variations of individual pulses. The method can differentiate the arterial phase and the venous phase within a single pulse of the PPG. The ratio of the two phases can be used to define a shorter test for venous refilling time.

In yet another embodiment, an electronic method and a system to decompose PPG pulse into arterial blood inflow and venous blood outflow is provided. Total blood flow at any time t is a summation of blood coming from an artery (arterial inflow) and blood going to a vein (venous outflow). Lymphatic flow can be calculated by subtracting the absolute venous outflow from Arterial Inflow. In yet another embodiment, ABF is a better measure of heart activity, blood circulation, and for estimating arterial blood pressure (ABP). In yet another embodiment, the ABF changes with different diseases. In yet another embodiment, using biphasic monitoring of the heart beat we can predict arterial pulse oxygen during the rising peak and the venous pulse oxygen during the venous peak.

In yet another embodiment, the lymphatic flow is obstructed in the diseases of lymphatic blockage. In an embodiment the lymphatic blockage is due to cancer metastatic to the lymphatic system. In yet another embodiment the flow blockage predicts the spread of the cancer. The prediction of the spread of the cancer thus predicts the cure by local removal of tissue as incomplete.

In yet another embodiment, an electronic method and a system for detecting and predicting sepsis in a subject using ABF, VBF, and LBF individually or in combination is provided.

In yet another embodiment the lymphatic flow is excessive in leaky blood vessels. In another embodiment the increased lymphatic flow can be a result of low oncotic pressure as seen in diseases causing low albumin, like liver and kidney diseases. In another embodiment it could be a disease of the blood wall and glycocalyx which leads to increased fluid passing through the lymphatics.

In yet another embodiment the Ultrasound images can be used to predict arterial, venous, and lymphatic flow from a defined area. Ultrasound frame rate is the speed with which the image is changed in per unit of time, generally defined in Hz or FPS. GE LOGIQ E9 (GE Systems Inc) has a frame rate of up to 600 fps, and can be used to predict the arterial, venous, and lymphatic flow. The change of return of ultrasound waves to the transducer over time can be used to predict the flow throughout the target arear using an embodiment defined herein.

In yet another embodiment, an electronic method and a system to perform venous phase pulse oximetry is provided. In another embodiment, the venous phase pulse oximetry is used to diagnose carbon monoxide poisoning, sepsis, congestive heart failure, hypertension, and diseases where venous flow has unextracted oxygen. In yet another embodiment, cardiac diseases such as constrictive pericarditis and heart failure are predicted on the basis of venous pulse morphology, in a non-invasive manner.

In yet another embodiment, respiratory assessments can be done using the pulse morphology and long-term cyclical pattern of pulse. Respiratory and cardiovascular systems are strongly coupled. For example, the sinus rhythm of the heart shows variations with respiration, which is called respiratory sinus arrhythmia. PPG signals can be used to estimate the respiratory rate (RR) most prominently in three ways: variation of HR as an autonomic response to respiration, variation in the perfusion baseline due to the intrathoracic pressure variation and variation in the peripheral pulse strength due to changing ventricular filling. The pulse reading involves processing each of the individual peaks of the pulses of the sample data of PPG, applying single pulse envelope wave (SPEV), Pulse tracing envelope wave (PTEV), applying kernel density estimates (KDE) on each of the individual pulses, and analyzing thereof for respiratory assessments of the subject responsive to divergence between actual and predicted dataset of the variations of individual pulses.

In yet another embodiment, an electronic method and system to measure heart rate variability using an intra-PPG pulse data based on a parameter such as peak width and/or height of the pulse is provided.

In yet another embodiment, an electronic method and system to measure peripheral blood flow using the PPG pulse data as obtained according to an embodiment herein is provided. The method or system employs a smartphone or any handheld device with a camera to obtain an image (or video) of a limb or any bodily organ, and processing using the methods as described herein to obtain and extract color information.

In yet another embodiment, an electronic method and system to predict an acute hemodynamic event by measuring/monitoring/analyzing PPG pulse according to an embodiment herein is provided. In an embodiment, the methods and system herein may be combined and processed together with pulse oximetry and spectrometry data to determine or predict acute hemodynamic events in a patient.

In yet another embodiment, an electronic method for evaluating endothelial health of a subject by measuring/monitoring/analyzing PPG pulse is disclosed herein. The method can replace Flow Mediated Dilation (FMD) testing or other methods for the evaluation of endothelial health of a subject. The current method of Flow Mediated Dilation (FMD) testing tests the hypoxic response to the application of a tourniquet. As shown in FIG. 4B, the change in PPG thickness pattern due to cold exposure can test the local neuronal reflux for autoregulation of blood flow. In another embodiment, has application in detecting neuropathy in diabetic patients.

In another embodiment, the ability to find pixel level blood flow by analyzing PPG is provided. In cancer tissue, because of opposite growth the blood vessels are not laid down properly. As they are not laid down properly, they elastic recoil of these blood vessels is poor. This gives us an opportunity to find areas where blood flow will flow in an abnormal fashion as compared to normal tissue. Thus, differentiating cancer from normal tissue. The third factor is to be able to map the blood flow back into an organized display so as to give information on which clinical action can be taken.

Figure 18:
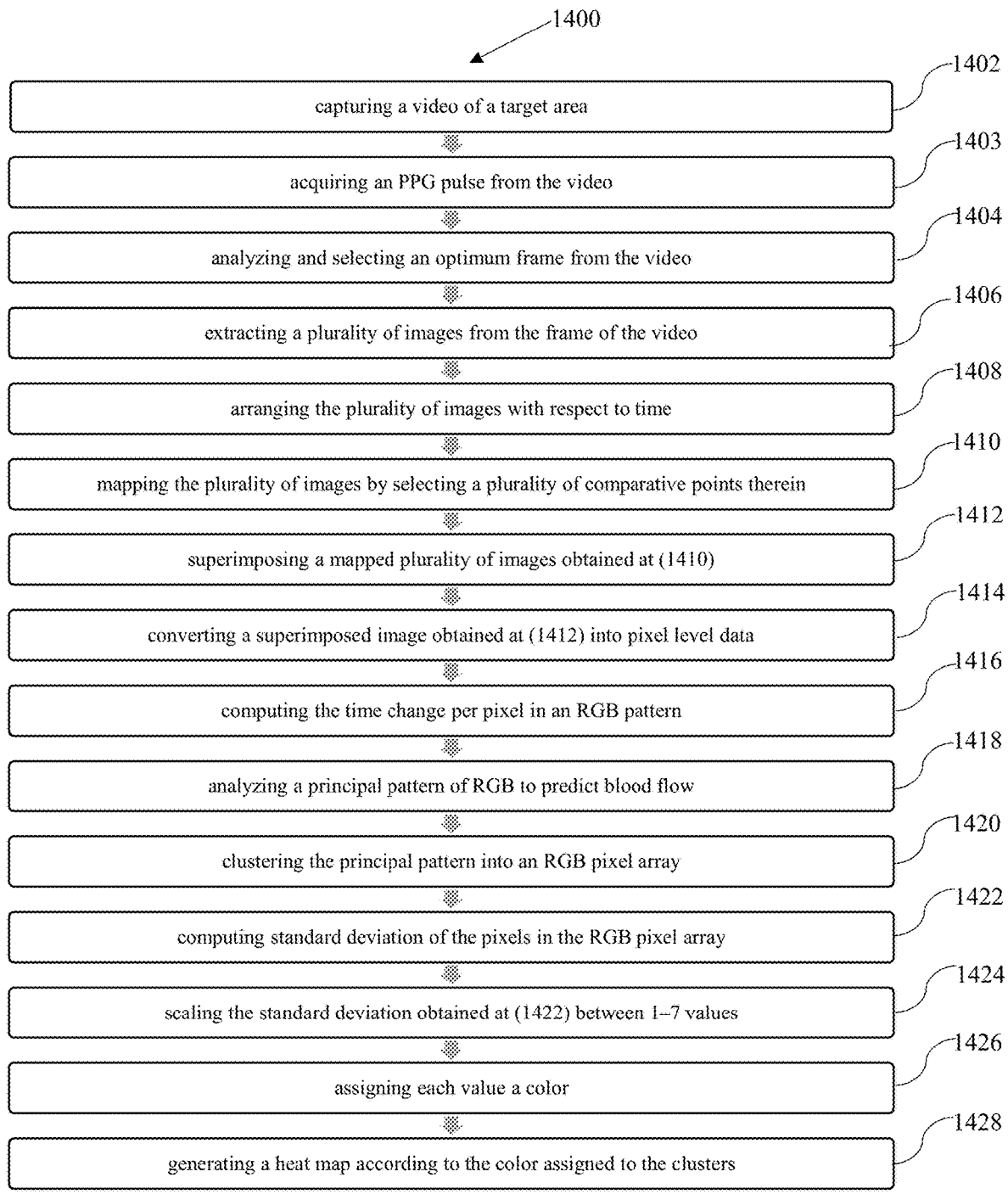
FIG. 18 illustrates a flowchart depicting an electronic method (1400) for predicting endoscopic blood flow pattern in real time is provided, according to another embodiment herein.

FIG. 18 illustrates an electronic method (1400) for predicting endoscopic blood flow pattern in real time is provided, according to an embodiment herein. The method (1400) comprising, capturing (1402) a video of a target area. The method (1400) further comprising, acquiring (1403) an PPG pulse from the video. The method (1400) further comprising, analyzing and selecting (1404) an optimum frame from the video. The method (1400) further comprising, extracting (1406) a plurality of images from the frame of the video. The method (1400) further comprising, arranging (1408) the plurality of images with respect to time. The method (1400) further comprising, mapping (1410) the plurality of images by selecting a plurality of comparative points therein. The method (1400) further comprising, superimposing (1412) a mapped plurality of images obtained at (1410). The method (1400) further comprising, converting (1414) a superimposed image obtained at (1412) into pixel level data. The method (1400) further comprising, computing (1416) the time change per pixel in an RGB pattern. The method (1400) further comprising, analyzing (1418) a principal pattern of RGB to predict blood flow. The method (1400) further comprising, clustering (1420) the principal pattern into an RGB pixel array. The method (1400) further comprising, computing (1422) standard deviation of the pixels in the RGB pixel array. The method (1400) further comprising, scaling (1424) the standard deviation obtained at (1422) between 1-7 values. The method (1400) further comprising, assigning (1426) each value a color and generating (1428) a heat map according to the color assigned to the clusters.

In yet another embodiment of the method (1400), wherein the target area comprises a part of the body of a subject, or a tissue, or an organ, or a combination of thereof. In yet another embodiment of the method (1400), wherein the video is captured in slow-motion at a frame rate above 30 fps. In yet another embodiment of the method (1400), wherein factors influencing RGB pattern are night vision capability, skin pigmentation, temperature, light condition, type of the camera used. In yet another embodiment of the method (1400), wherein the colors include violet, indigo, blue, green, yellow, red or a combination thereof. In yet another embodiment of the method (1400), wherein change in the red and blue color in the heat map over time predicts oxygen concentration in the area.

Figure 17A:
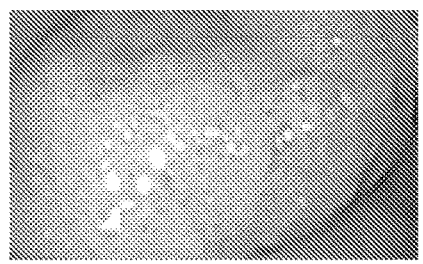
FIG. 17A is the endoscopic image of a colon polyp and FIG. 17B depicts a heat map developed from 17A using artificial intelligence image representing the blood flow, according to an embodiment herein.
Figure 17B:
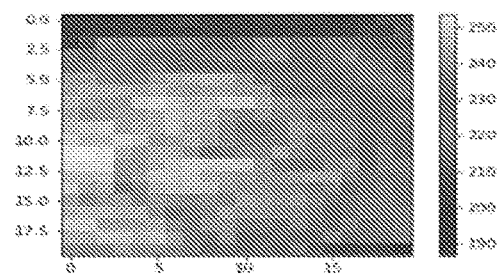
Figure 17:
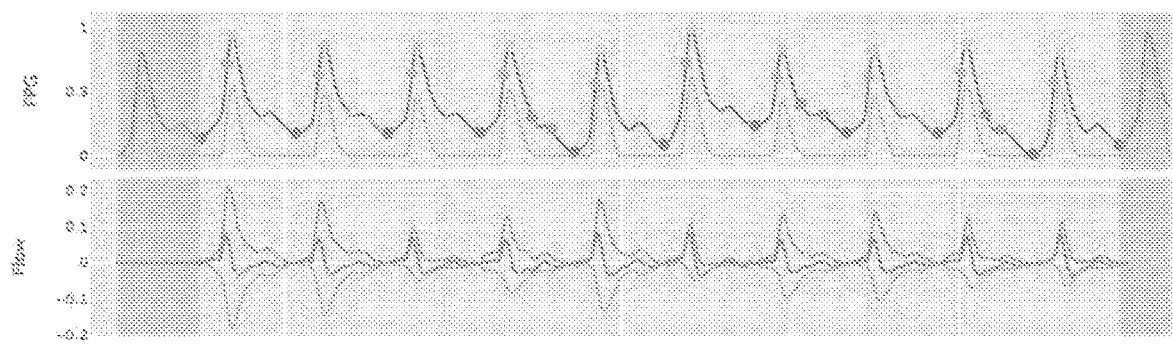
FIG. 17C depicts flow lines (represented in the lower part), split into Arterial, Venous, and Lymphatic flow as described, based on PPG (shown in top part)

FIG. 17A is the endoscopic image of a colon polyp and FIG. 17B represent the artificial intelligence-generated image representing the blood flow. X and Y axis, representing composite pixels value within the image (generated by summating multiple image pixels over time), the color-coding bar shows the statistical value based on the algorithm and the color assigned to the value. The image is a composite of each cell which is colored based on the assigned value based on the color-coding bar.

In yet another embodiment, an electronic method for evaluating the sympathetic drive in the body of a subject is disclosed herein. The Mayer Waves are oscillations of arterial pressure occurring spontaneously in conscious subjects at a frequency lower than respiration (~0.1 Hz in humans). Mayer waves are coupled with synchronous oscillations of efferent sympathetic nervous activity and are enhanced during states of sympathetic activation. The described method can be used to predict the development of hypertension.

In yet another embodiment, a modified method for evaluating pulse in patients in extreme environmental temperature. As shown in FIG. 4B, the temperature can change the thickness of the pulse reading and thus in patients with cold hands can make the pulse reading undetectable after filter application. The described method can be used for the evaluation of pulse in patients with significant environmental temperature differences.

In yet another embodiment, an electronic method and system to predict arterial stiffness is provided by employing only PPG data as processed according to an embodiment herein.

The PPG data as obtained according to an embodiment herein may further predict pulse wave velocities, mean arterial pressure, pulse pressure, % MAP (Mean Arterial Pressure). The data also can be used to predict clinical outcomes associated with these markers.

In yet another embodiment, a system and an electronic method to predict cardiac arrest is provided. The system is based on prediction or determination of pulse morphology changes and arterial stiffness, which is further obtained by measuring and analyzing PPG pulse according to an embodiment herein. PPG signal reflects various physiological behaviors which can be studied with different morphological features it contains. For this study, we have identified below morphological features for each pulse in each sub-segment.

Systolic Peak
Diastolic Peak
Dicrotic Notch
Maximum Slope Point

Figure 16:
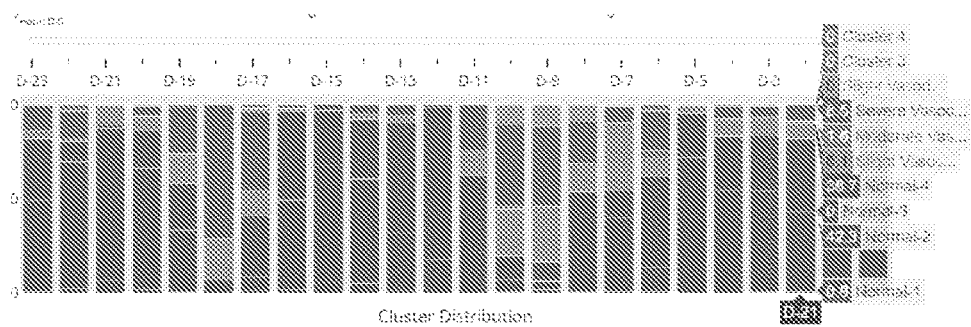
FIG. 16 depicts the percentage of clusters of wave morphology arranged with respect to time and the change in the percentage of clusters is recorded.

As shown in FIG. 16. The green proportion in each bar represents normal clusters and the intensity of red proportion represents the severity of vasoconstriction or vasodilation. The cyclical pattern of various clusters is indicative of the disease progression and reversal with the medical treatment as seen in FIG. 16.

Figure 19:
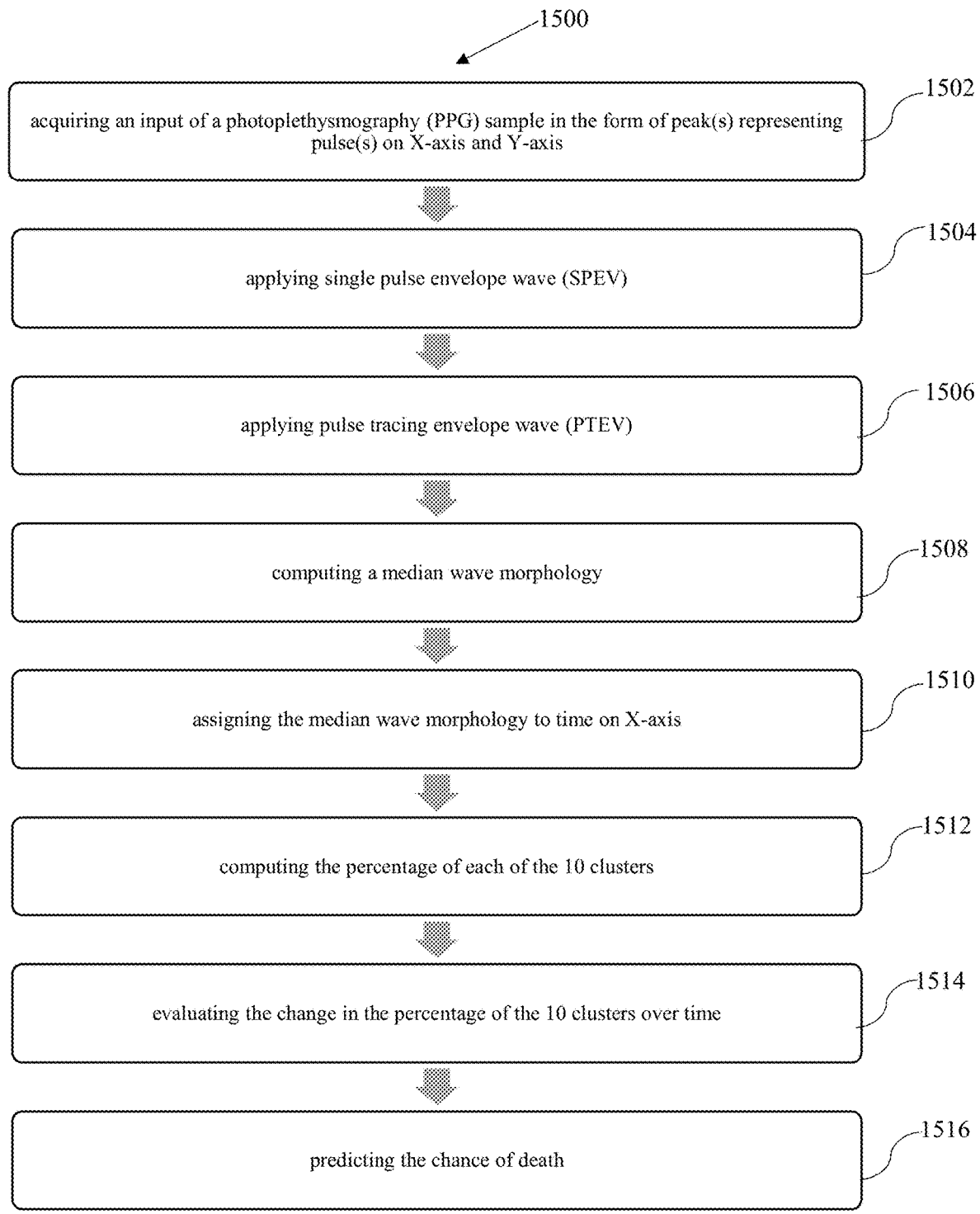
FIG. 19 illustrates a flowchart depicting an electronic method (1500) for predicting a chance of death in a subject is provided, according to another embodiment herein.

FIG. 19 illustrates an electronic method (1500) for predicting a chance of death in a subject is provided, according to an embodiment herein. The method (1500) comprising acquiring (1502) an input of a photoplethysmography (PPG) sample in the form of peak(s) representing pulse(s) on X-axis and Y-axis. The method (1500) further comprising, applying (1504) single pulse envelope wave (SPEV). The method (1500) further comprising, applying (1506) pulse tracing envelope wave (PTEV). The method (1500) further comprising, computing (1508) a median wave morphology. The method (1500) further comprising, assigning (1510) the median wave morphology to time on X-axis. The method (1500) further comprising, computing (1512) the percentage of each of the 10 clusters. The method (1500) further comprising, evaluating (1514) the change in the percentage of the 10 clusters overtime, and predicting (1516) the chance of death.

Figure 20:
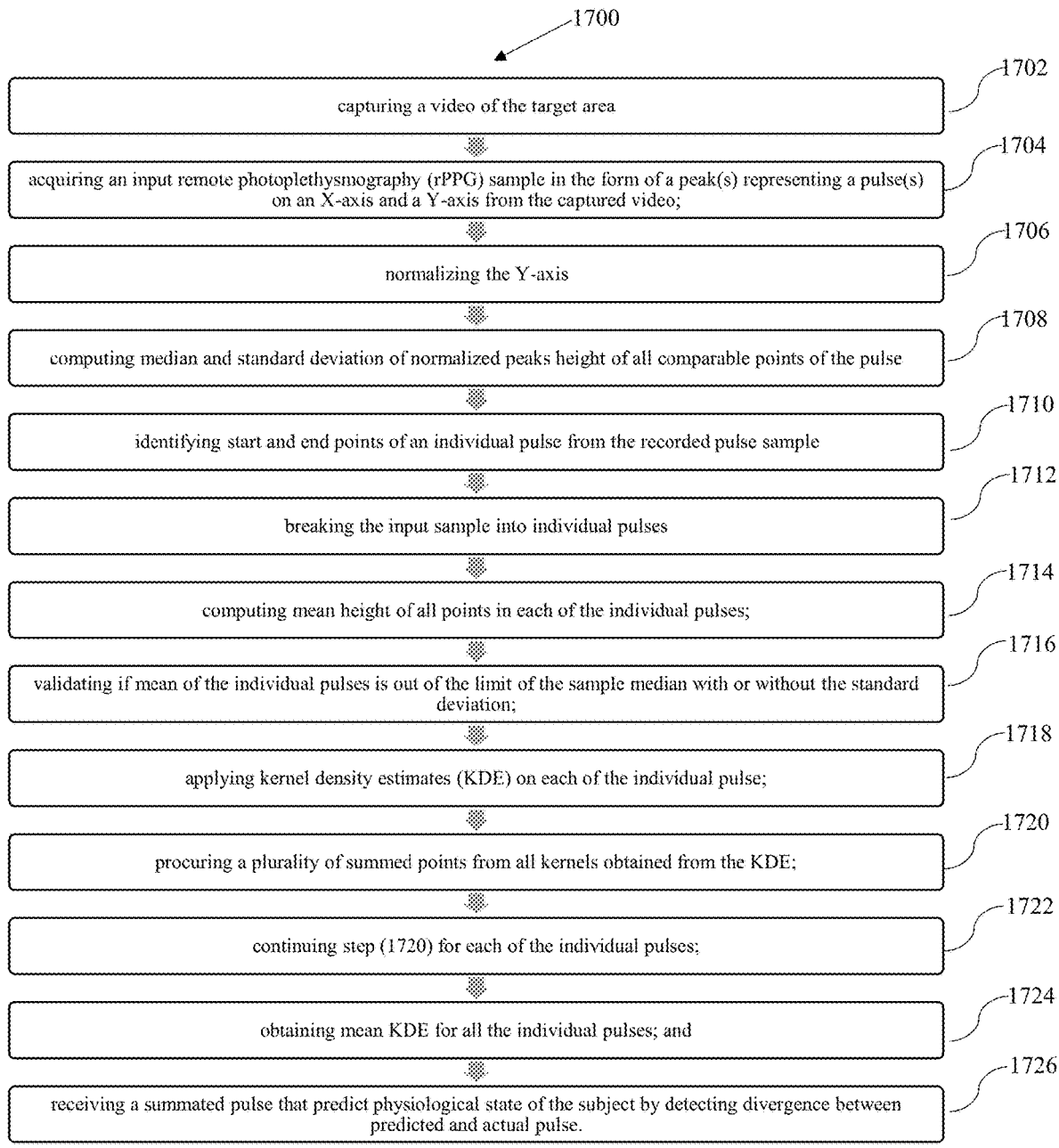
FIG. 20 illustrates a flowchart, depicting an electronic method (1700) for predicting physiological states of a subject is provided, according to another embodiment herein.

FIG. 20 illustrates another method (1700) for predicting physiological states of a subject is provided, according to an embodiment herein. The method (1700) comprising capturing (1702) a video of the target area. The method (1700) further comprising, acquiring (1704) an input remote photoplethysmography (rPPG) sample in the form of a peak(s) representing a pulse(s) on an X-axis and a Y-axis from the captured video. The method (1700) further comprising, normalizing (1706) the Y-axis. The method (1700) further comprising, computing (1708) median and standard deviation of normalized peaks height of all comparable points of the pulse. The method (1700) further comprising, identifying (1710) start and end points of an individual pulse from the recorded pulse sample. The method (1700) further comprising, breaking (1712) the input sample into individual pulses. The method (1700) further comprising, computing (1714) mean height of all points in each of the individual pulses. The method (1700) further comprising, validating (1716) if mean of the individual pulses is out of the limit of the sample median with or without the standard deviation. The method (1700) further comprising, applying (1718) kernel density estimates (KDE) on each of the individual pulse. The method (1700) further comprising, procuring (1720) a plurality of summed points from all kernels obtained from the KDE. The method (1700) further comprising, continuing (1722) step (1720) for each of the individual pulses. The method (1700) further comprising, obtaining (1724) mean KDE for all the individual pulses, and receiving (1726) a summated pulse that predict physiological state of the subject by detecting divergence between predicted and actual pulse.

In yet another embodiment, the method (1700) further comprises acquiring a video of the pulse of the subject. In yet another embodiment, the method (1700) further comprises acquiring images of the subject. In yet another embodiment, the method (1700) further comprises detecting and tracking facial patterns of the subject.

Figure 21:
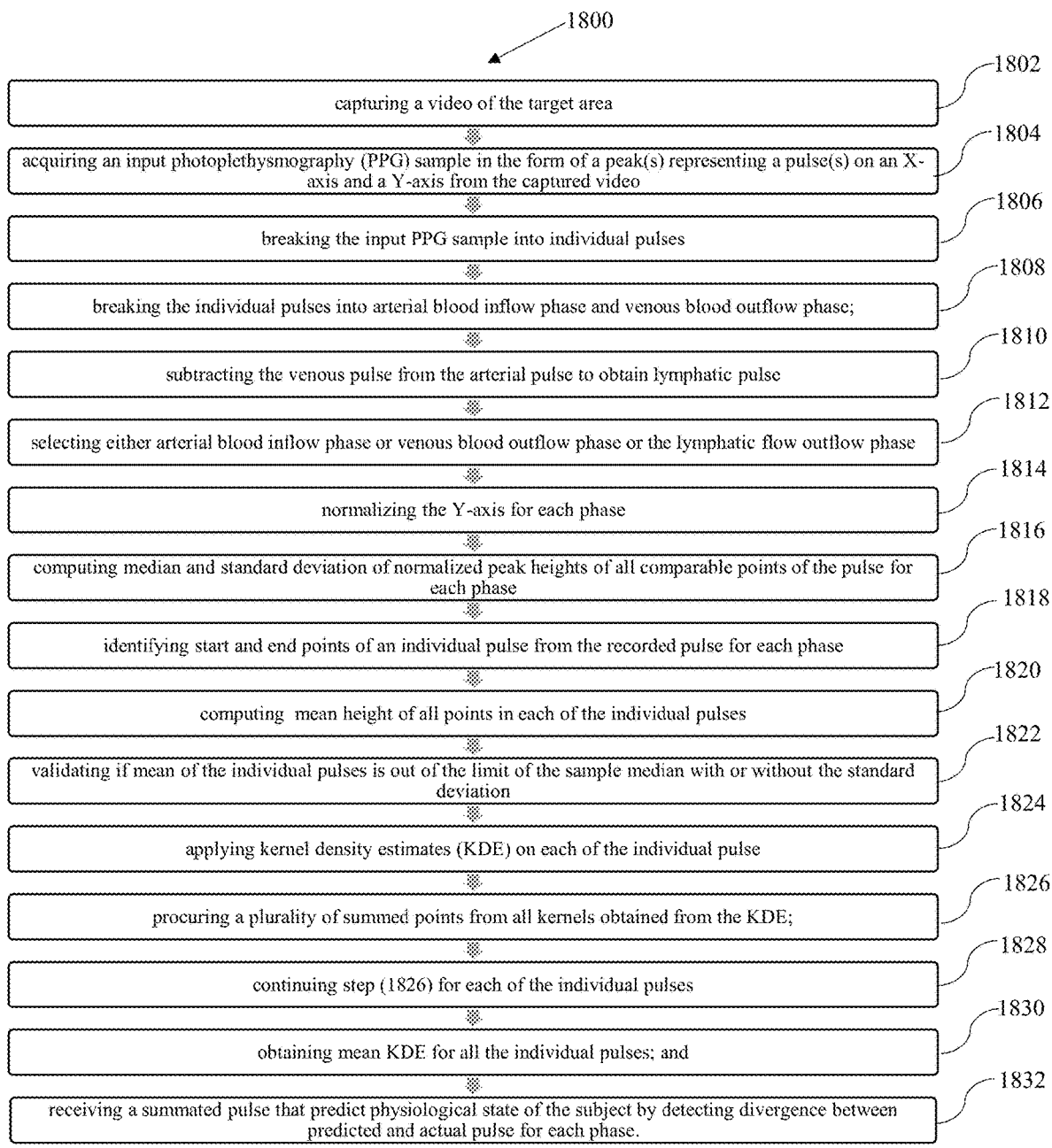
FIG. 21 illustrates a flowchart, depicting an electronic method (1800) for predicting physiological states of a subject is provided, according to another embodiment herein.

FIG. 21 illustrates another method (1800) for computing physiological states of a subject is provided, according to an embodiment herein. The method (1800) comprising capturing (1802) a video of the target area. The method (1800) further comprising, acquiring (1804) an input photoplethysmography (PPG) sample in the form of a peak(s) representing a pulse(s) on an X-axis and a Y-axis from the captured video. The method (1800) further comprising, breaking (1806) the input PPG sample into individual pulses. The method (1800) further comprising, breaking (1808) the individual pulses into arterial blood inflow phase and venous blood outflow phase. The method (1800) further comprising, subtracting (1810) the venous pulse from the arterial pulse to obtain lymphatic pulse. The method (1800) further comprising, selecting (1812) either arterial blood inflow phase or venous blood outflow phase or the lymphatic flow outflow phase. The method (1800) further comprising, normalizing (1814) the Y-axis for each phase. The method (1800) further comprising, computing (1816) median and standard deviation of normalized peak heights of all comparable points of the pulse for each phase. The method (1800) further comprising, identifying (1818) start and end points of an individual pulse from the recorded pulse for each phase. The method (1800) further comprising, computing (1820) mean height of all points in each of the individual pulses. The method (1800) further comprising, validating (1822) if mean of the individual pulses is out of the limit of the sample median with or without the standard deviation. The method (1800) further comprising, applying (1824) kernel density estimates (KDE) on each of the individual pulse. The method (1800) further comprising, procuring (1826) a plurality of summed points from all kernels obtained from the KDE. The method (1800) further comprising, continuing (1828) step (1826) for each of the individual pulses. The method (1800) further comprising, obtaining (1830) mean KDE for all the individual pulses and receiving (1832) a summated pulse that predict physiological state of the subject by detecting divergence between predicted and actual pulse for each phase.

In another embodiment, a system and method to assess hypertension is provided. The system and method include measuring and analyzing PPG pulse data according to an embodiment herein.

In another embodiment, a system and method to predict hypertension is provided. The system and method include measuring and analyzing PPG pulse data according to an embodiment herein.

In yet another embodiment, a system and an electronic method for detecting and predicting seizures in a subject using EEG with HRV as a biomarker is provided. In another embodiment, EEG and HRV are used with other autonomic factors as well such as blood pressure, body temperature, ECG for detection and prediction of seizure in a subject.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A method for predicting physiological states of a subject, the method comprising:
 a) acquiring an input photoplethysmography (PPG) sample in the form of a peak(s) representing a pulse(s) on an X-axis and a Y-axis from a video or an image of a target area of a subject;
 b) normalizing the Y-axis of the PPG sample;
 c) computing a median and a standard deviation of normalized peaks heights of all comparable points of the pulse;
 d) identifying start and end points of an individual pulse from the PPG sample;
 e) breaking the input PPG sample into a plurality of individual pulses;
 f) computing a mean height of all points in each of the individual pulses;
 g) validating if the mean height of each of the individual pulses is within a predetermined limit of the sample median;
 h) applying kernel density estimates (KDE) on each of the validated individual pulse to generate a plurality of kernels;
 i) procuring a plurality of summed points from the plurality of kernels;
 j). obtaining a mean KDE for all the validated individual pulses to generate a summated pulse
 k). acquiring an image of the body of the subject and converting the image into pixel-level data to generate an imaging analysis;
 l). capturing a facial pattern of the subject to generate a facial pattern analysis; and m). integrating the summated pulse, the imaging analysis, and the facial pattern analysis to predict the physiological state of the subject by detecting a divergence between a predicted dataset and an actual dataset.

2. The method of claim 1, further comprises computing average height and variation of peak of each individual pulse.

3. The method of claim 1, wherein the video or the image is obtained by endoscopy.

4. The method of claim 1, further comprises rejecting the particular segment of the pulses if the mean of the individual pulses is out of the limit of the sample median with or without the standard deviation.

5. The method of claim 1, further comprises applying the KDE on the individual pulses only if the mean of the individual pulses is within the limit of the sample median with or without the standard deviation.

6. The method of claim 1, wherein the physiological state is a pathophysiological state.

7. The method of claim 1, wherein the physiological state is selected from the group consisting of: drowsiness, alertness level, and fatigue.

8. The method of claim 1, wherein the physiological state is a cognitive state.

9. The method of claim 1, wherein predicting the physiological state comprises detecting if the subject is lying.

10. The method of claim 1, further comprising: breaking the individual pulses into an arterial blood inflow phase and a venous blood outflow phase, wherein applying the KDE is performed on at least one of the arterial blood inflow phase or the venous blood outflow phase.

11. A system for predicting physiological states of a subject, the system comprising:

a) a pulse reading module configured to acquire a photoplethysmography (PPG) sample from a video or an image of the subject;

b) an imaging module configured to capture an image of a target area of the subject;

c) a facial detection module configured to capture a facial pattern of the subject;

d) an EEG module configured to determine abnormalities in brain waves of the subject;

e) a quantification module communicatively coupled to the pulse reading module, the imaging module, the facial detection module, and the EEG module, the quantification module configured to:

i. process the PPG sample by normalizing the sample, breaking the sample into individual pulses, validating the individual pulses, applying kernel density estimates (KDE) to the validated individual pulses, and generating a summated pulse;

ii. process the image to generate an imaging analysis based on pixel-level data;

iii. process the facial pattern to generate a facial pattern analysis; and iv. integrate the summated pulse, the imaging analysis, the facial pattern analysis, and the brain wave abnormalities to predict the physiological state of the subject; and f) an output module that communicates with the quantification module, wherein the output module is configured to display a divergence between an actual and a predicted dataset.

* * * * *